(12) United States Patent
Baek et al.

(10) Patent No.: US 12,018,108 B2
(45) Date of Patent: Jun. 25, 2024

(54) MODIFIED CONJUGATED DIENE-BASED POLYMER

(71) Applicant: LG Chem, Ltd., Seoul (KR)

(72) Inventors: Geun Seung Baek, Daejeon (KR); Ro Mi Lee, Daejeon (KR); He Seung Lee, Daejeon (KR); Min Sik Mun, Daejeon (KR); No Ma Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 411 days.

(21) Appl. No.: 17/598,353

(22) PCT Filed: Nov. 27, 2020

(86) PCT No.: PCT/KR2020/017182
§ 371 (c)(1),
(2) Date: Sep. 27, 2021

(87) PCT Pub. No.: WO2021/107717
PCT Pub. Date: Jun. 3, 2021

(65) Prior Publication Data
US 2022/0185932 A1    Jun. 16, 2022

(30) Foreign Application Priority Data
Nov. 29, 2019    (KR) .................. 10-2019-0157390

(51) Int. Cl.
*C08F 236/10*    (2006.01)
(52) U.S. Cl.
CPC ........ *C08F 236/10* (2013.01); *C08F 2810/00* (2013.01)
(58) Field of Classification Search
CPC ... C08F 8/30; C08F 8/42; C08C 19/22; C08C 19/25
See application file for complete search history.

(56) References Cited

U.S. PATENT DOCUMENTS

| | | | |
|---|---|---|---|
| 4,397,994 A | 8/1983 | Takeuchi et al. | |
| 7,683,151 B2 | 3/2010 | Endou et al. | |
| 2005/0159554 A1* | 7/2005 | Endou | C08G 77/442 525/242 |
| 2008/0033110 A1 | 2/2008 | Suzuki et al. | |
| 2011/0077325 A1 | 3/2011 | Luo | |
| 2011/0146877 A1* | 6/2011 | Tanaka | C08L 9/00 152/547 |
| 2012/0184677 A1 | 7/2012 | Luo | |
| 2012/0220716 A1* | 8/2012 | Nakatani | C08C 19/25 556/425 |
| 2014/0357804 A1 | 12/2014 | Ito et al. | |
| 2015/0073166 A1 | 3/2015 | Nakatani et al. | |
| 2018/0305470 A1* | 10/2018 | Lee | C08K 5/56 |
| 2019/0077891 A1 | 3/2019 | Nakatani et al. | |
| 2019/0083949 A1 | 3/2019 | Lee et al. | |
| 2019/0330447 A1 | 10/2019 | Choe et al. | |
| 2020/0115485 A1* | 4/2020 | Kim | B60C 1/0041 |
| 2020/0277426 A1 | 9/2020 | Oh et al. | |
| 2020/0354482 A1 | 11/2020 | Lee et al. | |
| 2021/0179741 A1 | 6/2021 | Seo et al. | |

FOREIGN PATENT DOCUMENTS

| | | |
|---|---|---|
| CN | 1646576 A | 7/2005 |
| CN | 110121514 A | 8/2019 |
| EP | 2803699 A1 | 11/2014 |
| JP | H06271706 A | 9/1994 |
| JP | 2008208376 A | 9/2008 |
| JP | 2011057840 A | 3/2011 |
| JP | 2013142108 A | 7/2013 |
| JP | 2014122357 A | 7/2014 |
| JP | 2020512469 A | 4/2020 |
| JP | 2020530060 A | 10/2020 |
| JP | 2021505712 A | 2/2021 |
| JP | 2021512976 A | 5/2021 |
| KR | 20120083387 A | 7/2012 |
| KR | 20160079323 A | 7/2016 |
| KR | 20180028769 A | 3/2018 |
| KR | 20180073319 A | 7/2018 |
| KR | 20180080687 A | 7/2018 |
| KR | 101910146 B1 | 10/2018 |
| KR | 20180108305 A | 10/2018 |
| KR | 20180118764 A | 10/2018 |

(Continued)

OTHER PUBLICATIONS

Sutyagin, V.M., "Bondaletova L.I. Chemistry and Physics of Polymers," Textbook, Tomsk, © TPU Publishing House, Jun. 2003, p. 142, paragraph 1-2. [English Translation of Abstract only].

(Continued)

*Primary Examiner* — Robert C Boyle
(74) *Attorney, Agent, or Firm* — Lerner David LLP

(57) ABSTRACT

The present invention relates to a modified conjugated diene-based polymer, more particularly, a modified conjugated diene-based polymer prepared by continuous polymerization and accordingly, having specific polymer structure, molecular weight distribution and shape, excellent processability and narrow molecular weight distribution, a unimodal shape molecular weight distribution curve by gel permeation chromatography (GPC), and molecular weight distribution (PDI; MWD) of 1.0 to less than 1.7, and including a functional group derived from a modifier represented by Formula 1 at one terminal and a functional group derived from a modification initiator at the other terminal.

19 Claims, 4 Drawing Sheets

(56) References Cited

FOREIGN PATENT DOCUMENTS

| | | |
|---|---|---|
| KR | 20190066564 A | 6/2019 |
| KR | 20190066566 A | 6/2019 |
| KR | 20190066568 A | 6/2019 |
| KR | 20190066569 A | 6/2019 |
| KR | 20190066570 A | 6/2019 |
| NO | 2019216645 A1 | 11/2019 |
| RU | 2543874 C2 | 3/2015 |
| RU | 2560769 C2 | 8/2015 |
| RU | 2675525 C1 | 12/2018 |
| RU | 2680501 C1 | 2/2019 |
| TW | 201936645 A | 9/2019 |
| WO | 2005097845 A1 | 10/2005 |
| WO | 2019112260 A1 | 6/2019 |

OTHER PUBLICATIONS

International Search Report for Application No. PCT/KR2020/017182, dated Mar. 11, 2021, 4 pages.
Extended European Search Report including Written Opinion for Application No. 20892377.1 dated Mar. 14, 2022, pp. 1-6.
"Organometallic compounds, organic compounds", internet-source URL: https://www.booksite.ru/fulltext/1/001/008/075/864.htm, published in Wayback Internet Archive Machine, Mar. 22, 2007, 2 pages.

\* cited by examiner

[FIG. 1]
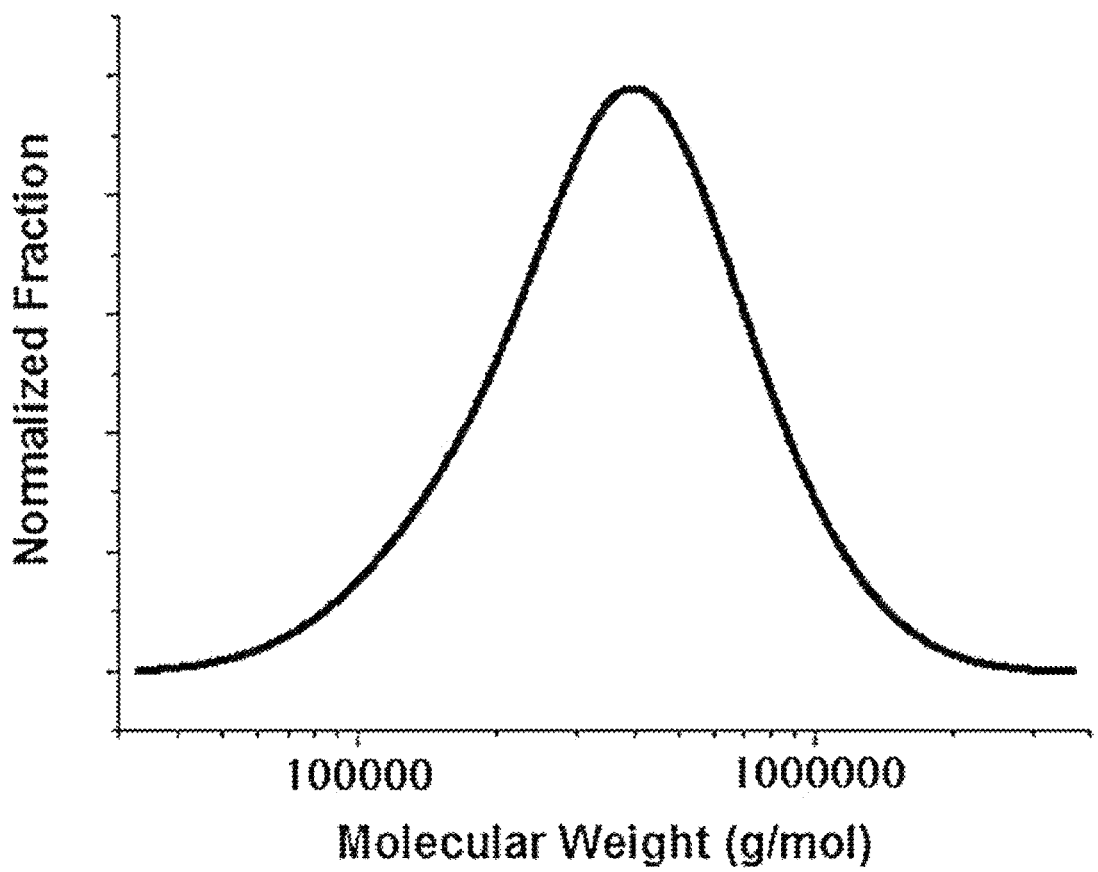

[FIG. 2]
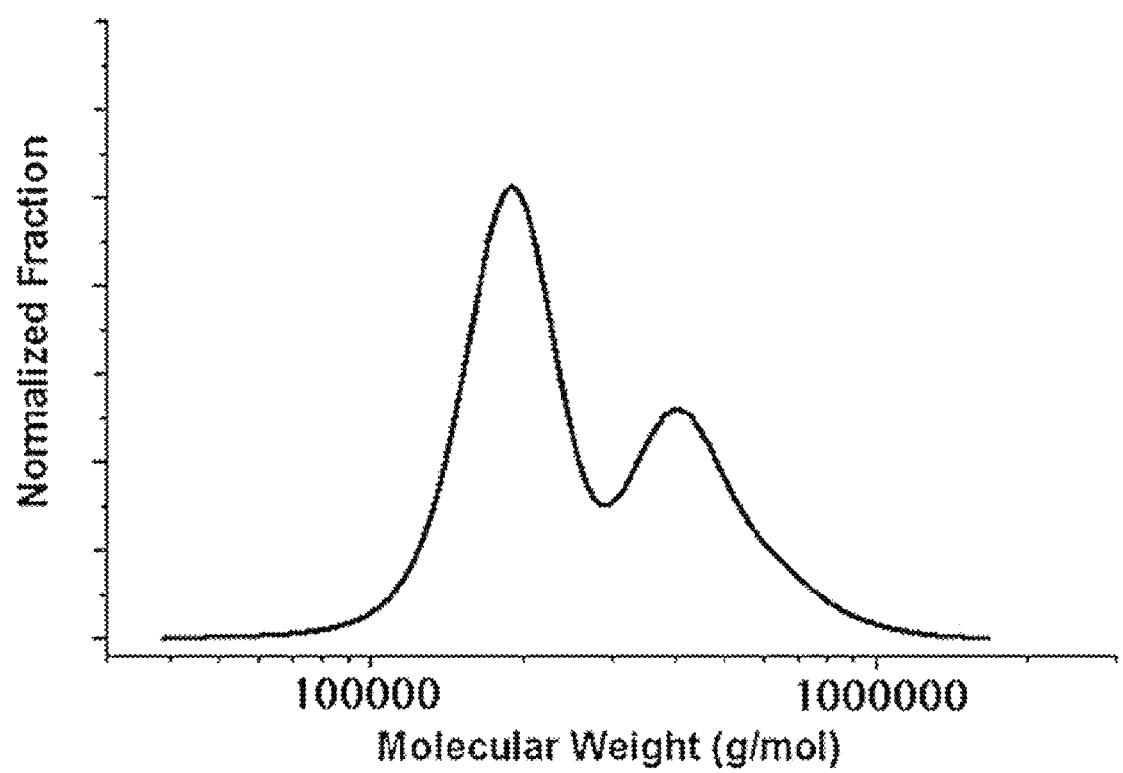

[FIG. 3]
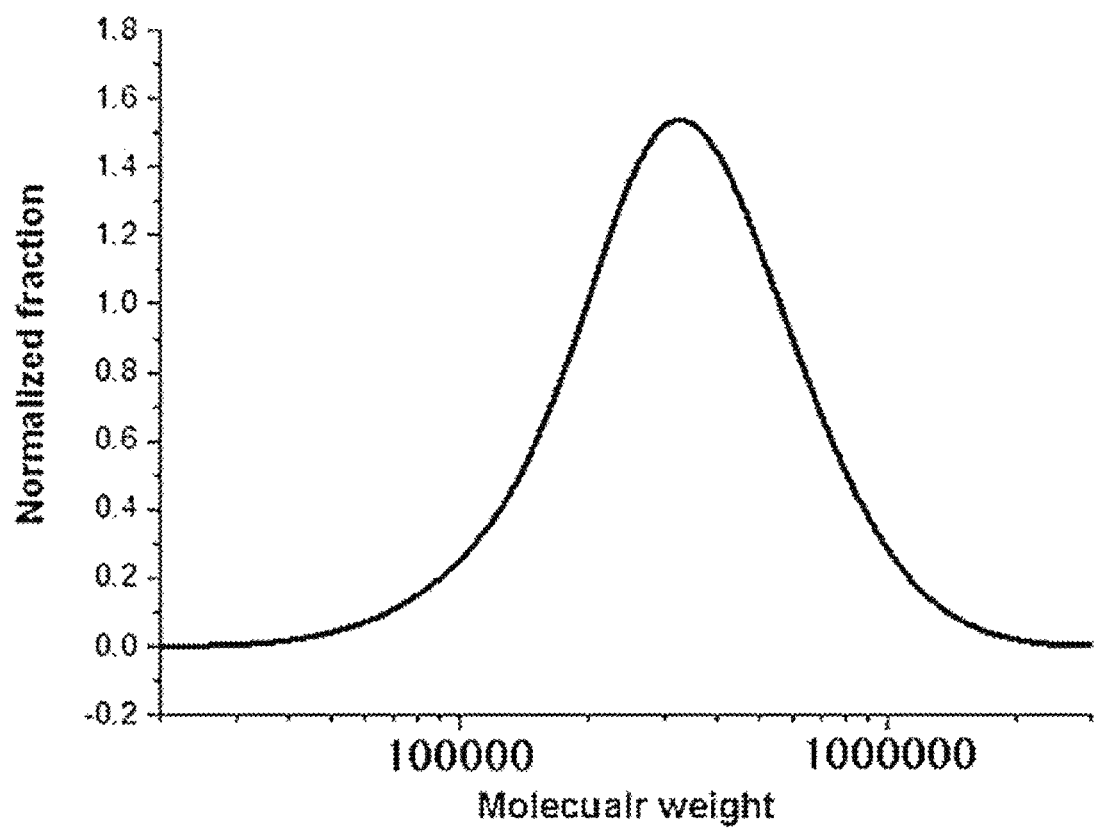

[FIG. 4]
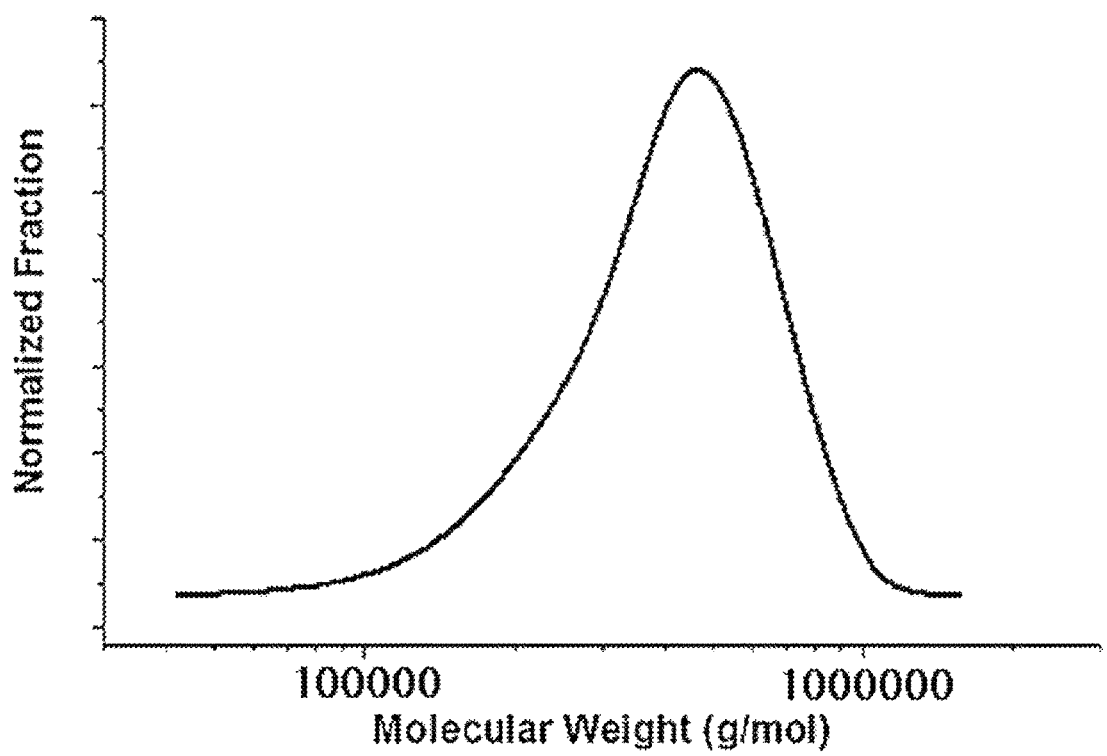

MODIFIED CONJUGATED DIENE-BASED POLYMER

CROSS-REFERENCE TO RELATED APPLICATIONS

The present application is a national phase entry under 35 U.S.C. § 371 of International Application No. PCT/KR2020/017182 filed Nov. 27, 2020, which claims priority from Korean Patent Application No. 10-2019-0157390, filed Nov. 29, 2019, all of which are incorporated herein by reference.

TECHNICAL FIELD

The present invention relates to a modified conjugated diene-based polymer which has excellent processability and good tensile strength and viscoelasticity properties.

BACKGROUND ART

According to the recent demand for cars having a low fuel consumption ratio, a conjugated diene-based polymer having modulational stability represented by wet skid resistance as well as low rolling resistance, and excellent abrasion resistance and tensile properties is required as a rubber material for tires.

In order to reduce the rolling resistance of tires, there is a method of reducing hysteresis loss of vulcanized rubber, and rebound resilience at 50° C. to 80° C., tan δ, Goodrich heating, or the like is used as an evaluation index of the vulcanized rubber. That is, it is desirable to use a rubber material having high rebound resilience at the above temperature or a low tan δ value or Goodrich heating.

Natural rubbers, polyisoprene rubbers, or polybutadiene rubbers are known as rubber materials having low hysteresis loss, but these rubbers have a limitation of low wet skid resistance. Thus, recently, conjugated diene-based polymers or copolymers such as styrene-butadiene rubbers (hereinafter, referred to as "SBR") and butadiene rubbers (hereinafter, referred to as "BR"), are prepared by emulsion polymerization or solution polymerization to be used as rubbers for tires. Among these polymerization methods, the greatest advantage of the solution polymerization in comparison to the emulsion polymerization is that the vinyl structure content and the styrene content, which specify physical properties of the rubber, may be arbitrarily adjusted and its molecular weight and physical properties may be controlled by coupling or modification. Thus, the SBR prepared by the solution polymerization is widely used as a rubber material for tires because it is easy to change a structure of the finally prepared SBR or BR, and movement of chain terminals may be reduced and a coupling force with a filler such as silica and carbon black may be increased by coupling or modification of the chain terminals.

If the solution-polymerized SBR is used as the rubber material for tires, since a glass transition temperature of the rubber is increased by increasing the vinyl content in the SBR, physical properties such as running resistance and braking force, required for tires may be controlled, and fuel consumption may be reduced by appropriately adjusting the glass transition temperature. The solution-polymerized SBR is prepared by using an anionic polymerization initiator and is being used by coupling or modifying the chain terminals of the polymer thus formed using various modifiers. For example, U.S. Pat. No. 4,397,994 discloses a method of coupling active anions of the chain terminals of a polymer obtained by polymerizing styrene-butadiene using alkyllithium which is a monofunctional initiator in a non-polar solvent, using a coupling agent such as a tin compound.

Meanwhile, the polymerization of SBR or BR may be conducted by batch-type or continuous-type polymerization. According to the batch-type polymerization, the polymer thus prepared has narrow molecular weight distribution and merits in view of the improvement of physical properties, but there are problems with low productivity and deteriorated processability. According to the continuous-type polymerization, polymerization is continuously carried out and there are merits in view of excellent productivity and the improvement of processability, but there are problems with wide molecular weight distribution and inferior physical properties. Therefore, research on improving productivity, processability and physical properties at the same time during preparing SBR or BR is continuously required.

PRIOR ART DOCUMENTS

Patent Documents (Patent Document 1) U.S. Pat. No. 4,397,994A
(Patent Document 2) JP1994-271706 A

DISCLOSURE OF THE INVENTION

Technical Problem

The present invention has been devised to solve the above-mentioned problems of the conventional technique, and an object of the present invention is to provide a modified conjugated diene-based polymer prepared by continuous-type polymerization and having excellent processability, good physical properties such as tensile properties, and excellent viscoelasticity properties.

Technical Solution

To solve the above-described tasks, according to an embodiment of the present invention, the present invention provides a modified conjugated diene-based polymer having a unimodal shape molecular weight distribution curve by gel permeation chromatography (GPC), and molecular weight distribution (PDI; MWD) of 1.0 to less than 1.7, wherein the modified conjugated diene-based polymer includes a functional group derived from a modifier represented by Formula 1 below at one terminal, and a functional group derived from a modification initiator at the other terminal.

[Formula 1]

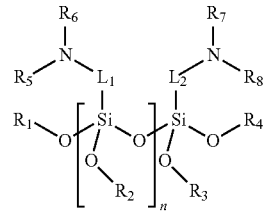

In Formula 1, $R_1$ to $R_8$ are each independently an alkyl group of 1 to 20 carbon atoms; $L_1$ and $L_2$ are each independently an alkylene group of 1 to 20 carbon atoms; and n is an integer of 2 to 4.

Advantageous Effects

The modified conjugated diene-based polymer according to the present invention is prepared by continuous polymerization in which a polymerization conversion ratio is controlled, and has a unimodal shape molecular weight distribution curve by gel permeation chromatography and narrow molecular weight distribution of less than 1.7, thereby the conjugated diene-based polymer may have excellent processability and good tensile properties and viscoelasticity properties.

In addition, the modified conjugated diene-based polymer according to the present invention includes a functional group derived from a modification initiator at one terminal and a functional group derived from a modifier at the other terminal, thereby further improving viscoelasticity properties.

BRIEF DESCRIPTION OF THE DRAWINGS

The accompanying drawings in the present disclosure illustrate particular embodiments of the present invention and are included together with the above description to provide a further understanding of the inventive concept. The inventive concept, however, should not be construed as limited to the accompanying drawings.

FIG. 1 illustrates a molecular weight distribution curve by gel permeation chromatography (GPC) of a modified conjugated diene-based polymer of Example 1 according to an embodiment of the present invention.

FIG. 2 illustrates a molecular weight distribution curve by gel permeation chromatography (GPC) of a modified conjugated diene-based polymer of Comparative Example 1 according to an embodiment of the present invention.

FIG. 3 illustrates a molecular weight distribution curve by gel permeation chromatography (GPC) of a modified conjugated diene-based polymer of Comparative Example 10 according to an embodiment of the present invention.

FIG. 4 illustrates a molecular weight distribution curve by gel permeation chromatography (GPC) of a modified conjugated diene-based polymer of Comparative Example 11 according to an embodiment of the present invention.

BEST MODE FOR CARRYING OUT THE INVENTION

Hereinafter, the present invention will be described in more detail in order to assist the understanding of the present invention.

It will be understood that words or terms used in the description and claims of the present invention shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

Definition of Terms

The term "alkyl group" in the present invention may mean monovalent aliphatic saturated hydrocarbon, and may include a linear alkyl group such as methyl, ethyl, propyl and butyl; a branched alkyl group such as isopropyl, sec-butyl, tert-butyl and neo-pentyl; and a cyclic saturated hydrocarbon, or a cyclic unsaturated hydrocarbon group including one or two or more unsaturated bonds.

The term "alkylene group" used in the present invention may mean divalent aliphatic saturated hydrocarbon such as methylene, ethylene, propylene and butylene.

The term "derived unit" and "derived functional group" used in the present invention may represent a component or a structure comes from a certain material, or the material itself.

The term "single bond" used in the present invention may mean a single covalent bond itself excluding a separate atomic or molecular group.

Measurement Methods

In the disclosure, "weight average molecular weight (Mw)", "molecular weight distribution (MWD)", and "unimodal properties" were obtained by measuring a weight average molecular weight (Mw) and a number average molecular weight (Mn) by gel permeation chromatograph (GPC) (PL GPC220, Agilent Technologies), obtaining a molecular weight distribution curve, and calculating molecular weight distribution (PDI, MWD, Mw/Mn) from each of the molecular weights thus measured.

- column: using two of PLgel Olexis (Polymer Laboratories Co.) and one of PLgel mixed-C (Polymer Laboratories Co.) in combination
- solvent: using a mixture of tetrahydrofuran (THF) and 2 wt % of an amine compound
- flow rate: 1 ml/min
- specimen concentration: 1-2 mg/ml (diluted in THF)
- injection amount: 100 μl
- column temperature: 40° C.
- Detector: Refractive index
- Standard: Polystyrene (calibrated by cubic function)

In the disclosure, the mooney stress relaxation ratio was measured by using MV2000 of Alpha Technologies Co. using Large Rotor at a rotor speed of 2±0.02 rpm at 100° C. Particularly, a polymer was stood at room temperature (23±5° C.) for 30 minutes or more, and 27±3 g was collected and put in a die cavity, and then, Platen was operated, and mooney viscosity was measured while applying torque. In addition, after measuring the mooney viscosity, the slope value of the change of the mooney viscosity shown while releasing torque was measured, and the mooney stress relaxation ratio was obtained as the absolute value thereof.

In the disclosure, the "Si content" is measured via an ICP analysis method, and measured by using an inductively coupled plasma optical emission spectroscopy (ICP-OES; Optima 7300DV). By using the inductively coupled plasma optical emission spectroscopy, measurement was performed by adding about 0.7 g of a specimen to a platinum (Pt) crucible, adding about 1 mL of concentrated sulfuric acid (98 wt %, electronic grade) thereto, heating at 300° C. for 3 hours, incinerating the specimen in an electrical furnace (Thermo Scientific, Lindberg Blue M) by the following program of steps 1 to 3:

1) step 1: initial temp 0° C., rate (temp/hr) 180° C./hr, temp (holdtime) 180° C. (1 hr),
2) step 2: initial temp 180° C., rate (temp/hr) 85° C./hr, temp (holdtime) 370° C. (2 hr), and
3) step 3: initial temp 370° C., rate (temp/hr) 47° C./hr, temp (holdtime) 510° C. (3 hr), adding 1 mL of concentrated nitric acid (48 wt %) and 20 μl of concentrated hydrofluoric acid (50 wt %) to a residue, sealing the platinum crucible and shaking for 30 minutes or more, adding 1 mL of boric acid to the specimen, storing at 0° C. for 2 hours or more, diluting in 30 ml ultrapure water, and performing incineration. Also, the specimen is a state from which solvents are removed by putting the specimen in hot water heated by steam and stirring, and remaining monomer and remaining modifier are also required to be removed. If oil is added, the oil is also required to be removed through extraction before measurement.

In the disclosure, the "N content" may be measured, for example, through an NSX analysis method, and measurement by the NSX analysis method may use a quantitative analyzer of a trace amount of nitrogen (NSX-2100H). Particularly, a quantitative analyzer of a trace amount of nitrogen (Auto sampler, Horizontal furnace, PMT & Nitrogen detector) was turned on, carrier gas flow amounts were set to 250 ml/min for Ar, 350 ml/min for $O_2$, and 300 ml/min for ozonizer, a heater was set to 800° C., and the analyzer was stood for about 3 hours for stabilization. After stabilizing the analyzer, a calibration curve of calibration curve ranges of 5 ppm, 10 ppm, 50 ppm, 100 ppm and 500 ppm was made using Nitrogen standard (AccuStandard S-22750-01-5 ml), and an area corresponding to each concentration was obtained. Then, by using the ratios of concentrations to areas, a straight line was made. After that, a ceramic boat holding 20 mg of a specimen was put in the auto sampler of the analyzer and measurement was conducted to obtain an area. By using the area of the specimen thus obtained and the calibration curve, the N content was calculated.

In this case, the specimen used for the NSX analysis method is a modified conjugated diene-based polymer specimen from which solvents are removed by putting the specimen in hot water heated by steam and stirring, and may be a specimen from which remaining monomer and remaining modifier are removed. In addition, if oil is added to the specimen, the specimen may be a specimen after extracting (removing) oil.

Modified Conjugated Diene-based Polymer

The present invention provides a modified conjugated diene-based polymer prepared by continuous polymerization and has excellent processability, narrow molecular weight distribution and excellent physical properties.

The modified conjugated diene-based polymer according to an embodiment of the present invention is characterized in having a unimodal shape molecular weight distribution curve by gel permeation chromatography (GPC), and molecular weight distribution (PDI; MWD) of 1.0 to less than 1.7, wherein the modified conjugated diene-based polymer includes a functional group derived from a modifier represented by Formula 1 below at one terminal, and a functional group derived from a modification initiator at the other terminal.

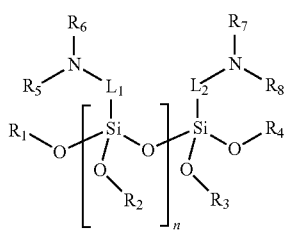

[Formula 1]

In Formula 1, $R_1$ to $R_8$ are each independently an alkyl group of 1 to 20 carbon atoms; $L_1$ and $L_2$ are each independently an alkylene group of 1 to 20 carbon atoms; and n is an integer of 2 to 4.

According to an embodiment of the present invention, the modified conjugated diene-based polymer may include a repeating unit derived from a conjugated diene-based monomer, a functional group derived from a modification initiator and a functional group derived from a modifier. The repeating unit derived from a conjugated diene-based monomer may mean a repeating unit formed by a conjugated diene-based monomer during polymerization, the functional group derived from a modification initiator and the functional group derived from a modifier may mean functional groups derived from a modification initiator and a functional group derived from a modifier, respectively, which are respectively present at the terminals of a polymer chain.

In addition, according to another embodiment of the present invention, the modified conjugated diene-based polymer may be a copolymer including a repeating unit derived from a conjugated diene-based monomer, a repeating unit derived from an aromatic vinyl-based monomer, a functional group derived from a modification initiator and a functional group derived from a modifier. Here, the repeating unit derived from an aromatic vinyl-based monomer may mean a repeating unit formed by an aromatic vinyl-based monomer during polymerization.

According to an embodiment of the present invention, the conjugated diene-based monomer may be one or more selected from the group consisting of 1,3-butadiene, 2,3-dimethyl-1,3-butadiene, piperylene, 3-butyl-1,3-octadiene, isoprene, 2-phenyl-1,3-butadiene and 2-halo-1,3-butadiene (halo means a halogen atom).

The aromatic vinyl-based monomer may include, for example, one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl) styrene, 1-vinyl-5-hexylnaphthalene, 3-(2-pyrrolidino ethyl) styrene, 4-(2-pyrrolidino ethyl) styrene and 3-(2-pyrrolidino-1-methyl ethyl)-α-methylstyrene.

In another embodiment, the modified conjugated diene-based polymer may be a copolymer which further includes a repeating unit derived from a diene-based monomer of 1 to 10 carbon atoms together with the repeating unit derived from the conjugated diene-based monomer. The repeating unit derived from the diene-based monomer may be a repeating unit derived from a diene-based monomer which is different from the conjugated diene-based monomer, and the diene-based monomer which is different from the conjugated diene-based monomer may be, for example, 1,2-butadiene. If the modified conjugated diene-based polymer is a copolymer further including a diene-based monomer, the modified conjugated diene-based polymer may include the repeating unit derived from the diene-based monomer in an amount of greater than 0 wt % to 1 wt %, greater than 0 wt % to 0.1 wt %, greater than 0 wt % to 0.01 wt %, or greater than 0 wt % to 0.001 wt %, and within this range, effects of preventing gel formation may be achieved.

According to an embodiment of the present invention, the copolymer may be a random copolymer, and in this case, effects of excellent balance between physical properties may be achieved. The random copolymer may mean the arrangement of repeating units forming a copolymer in disorder.

The modified conjugated diene-based polymer according to an embodiment of the present invention may have a number average molecular weight (Mn) of 1,000 g/mol to 2,000,000 g/mol, 10,000 g/mol to 1,000,000 g/mol, or 100,000 g/mol to 800,000 g/mol, a weight average molecular weight (Mw) of 1,000 g/mol to 3,000,000 g/mol, 10,000 g/mol to 2,000,000 g/mol, or 100,000 g/mol to 2,000,000 g/mol, and a peak average molecular weight (Mp) of 1,000 g/mol to 3,000,000 g/mol, 10,000 g/mol to 2,000,000 g/mol, or 100,000 g/mol to 2,000,000 g/mol. Within these ranges, effects of excellent rolling resistance and wet skid resistance may be achieved.

In another embodiment, the modified conjugated diene-based polymer may have molecular weight distribution (PDI; MWD; Mw/Mn) as a ratio of a weight average molecular weight (Mw) and a number average molecular weight (Mn) of 1.0 to less than 1.7, particularly preferably, 1.1 to less than 1.7, and within this range, effects of excellent tensile properties, viscoelasticity properties, and balance between physical properties may be achieved.

At the same time, the modified conjugated diene-based polymer has a unimodal shape molecular weight distribution curve by gel permeation chromatography (GPC), which corresponds to molecular weight distribution shown by a polymer prepared by continuous-type polymerization and may indicate that the modified conjugated diene-based polymer has uniform properties. That is, the modified conjugated diene-based polymer according to an embodiment of the present invention is prepared by continuous-type polymerization, and thus, has a unimodal shape molecular weight distribution curve and molecular weight distribution of 1.0 to less than 1.7.

Generally, in case of preparing a conjugated diene-based polymer and performing modification reaction by a batch type polymerization method, the molecular weight distribution curve of the modified conjugated diene-based polymer thus prepared has a multimodal which is a bimodal or higher molecular weight distribution curve. Particularly, in case of the batch type polymerization, polymerization reaction may be initiated after injecting all raw materials and the propagation of chains may be carried out at various initiation points simultaneously due to a plurality of initiators, and accordingly, the molecular weight of the polymer chains thus prepared may be constant and a unimodal shape having significantly narrow molecular weight distribution may be obtained. However, in case of performing modification reaction by injecting a modifier, two cases of "un-modification" and "achieving modification and coupling" may arise, and accordingly, two groups having a large molecular weight difference may be formed in the polymer chains, and as a result, a multimodal molecular weight distribution curve having two or more peaks in a molecular weight distribution curve may be formed. Meanwhile, in case of a continuous type polymerization method according to an embodiment of the present invention, different from the batch type polymerization, the initiation of reaction and the injection of raw materials are conducted continuously, the generation points of initiation points when the reaction is initiated, are different. Accordingly, the initiation points of polymerization are diverse including the initial stage of reaction, the middle stage of reaction, the last stage of reaction, etc., and after finishing polymerization reaction, polymer chains having diverse molecular weights are prepared. Accordingly, a specific peak is not dominant in a curve showing molecular weight distribution and the curve showing molecular weight distribution is wide as a single peak, and though chains of which polymerization are initiated at the last stage of the reaction are coupled, the molecular weight thereof may be similar to that of a chain of which polymerization is initiated at the initial stage, and thus, the diversity of molecular weight distribution may be kept same, and generally, the unimodal distribution curve may be still maintained.

Modification conditions may be controlled so as to have the unimodal shape in case of preparing and modifying a polymer by the batch type polymerization method, but in this case, the uncoupling of entire polymer is required or the coupling of entire polymer is required, and otherwise, a unimodal molecular weight distribution curve may not be shown.

In addition, in case where the entire polymer is coupled as the case where the molecular weight distribution curve of the modified conjugated diene-based polymer shows unimodal distribution though being prepared by the batch type polymerization method as described above, only polymers having equivalent degree of molecular weight are present and processability may be inferior and compounding properties may be inferior, because functional groups which may interact with a filler such as silica and carbon black may decrease via coupling. On the contrary, in case where the entire polymer is uncoupled, functional groups at the terminal of a polymer, which are required to make interaction with a filler such as silica and carbon black during processing, preferably interact with each other to arise the preventing phenomenon of interaction with a filler and significantly deteriorate processability. In the end, in case of controlling to have a unimodal shape molecular weight distribution curve while preparing a polymer by a batch type polymerization method, the processability and compounding properties of the modified conjugated diene-based polymer thus prepared may be deteriorated, and particularly, the processability may be significantly deteriorated.

Meanwhile, the coupling of the modified conjugated diene-based polymer may be confirmed by a coupling number (C.N), and here, the coupling number is a value dependent on the number of functional groups in the presence of a modifier which may couple with polymer after modification of polymer. That is, the coupling number represents the ratio of a polymer only composed of terminal modification without coupling between polymer chains and a polymer in which multiple polymer chains are coupled with one modifier, and may have a range of $1 \leq C.N \leq F$, where F means the number of functional groups which may react with an active polymer terminal in a modifier. In other words, a modified conjugated diene-based polymer having a coupling number of 1 means that the entire polymer chain is uncoupled, and the modified conjugated diene-based polymer having the coupling number of F means that the entire polymer chain is coupled.

Accordingly, the modified conjugated diene-based polymer according to an embodiment of the present invention may have a unimodal shape molecular weight distribution curve, and the coupling number may be greater than 1 and less than the number of functional groups of the modifier used ($1 < C.N < F$).

In another embodiment, the modified conjugated diene-based polymer may have the Si content based on a weight of 50 ppm or more, 100 ppm or more, 100 ppm to 10,000 ppm, or 100 ppm to 5,000 ppm, and within this range, a rubber composition including the modified conjugated diene-based polymer has effects of showing excellent mechanical properties such as tensile properties and viscoelasticity properties. The Si content may mean the content of Si atoms present in the modified conjugated diene-based polymer. Meanwhile, the Si atom may be derived from the functional group derived from a modifier.

In another embodiment, the modified conjugated diene-based polymer may have the N content based of a weight of 50 ppm or more, 100 ppm or more, 100 ppm to 10,000 ppm or 100 ppm to 5,000 ppm, and within this range, a rubber composition including the modified conjugated diene-based polymer has effects of showing excellent mechanical properties such as tensile properties and viscoelasticity properties. The N content may mean the content of N atoms present in the modified conjugated diene-based polymer, and in this case, the N atom may be derived from the functional group derived from a modifier. In addition, the N atom may include N atoms derived from a functional group derived from a modification initiator according to circumstances.

In another embodiment, the modified conjugated diene-based polymer may have a mooney stress relaxation ratio measured at 100° C. of 0.7 or more, 0.7 to 3.0, 0.7 to 2.5, or 0.7 to 2.0.

Here, the mooney stress relaxation ratio represents the stress change shown as the response to the same amount of strain, and may be measured using a mooney viscometer.

Meanwhile, the mooney stress relaxation ratio may be used as the index of the branch structure of a corresponding polymer. For example, in case of comparing polymers having the same mooney viscosity, the mooney stress relaxation ratio decreases with the increase of branching and may be used as the index of the degree of branching.

In addition, the modified conjugated diene-based polymer may have mooney viscosity at 100° C. 30 or more, 40 to 150, or 40 to 140, and within this range, excellent effects of processability and productivity may be achieved.

In addition, the modified conjugated diene-based polymer may have the vinyl content of 5 wt % or more, 10 wt % or more, or 10 wt % to 60 wt %. Here, the vinyl content may mean the amount of not 1,4-added but 1,2-added conjugated diene-based monomer based on 100 wt % of a conjugated diene-based copolymer composed of a monomer having a vinyl group and an aromatic vinyl-based monomer.

Meanwhile, the modifier according to the present invention may be a modifier for modifying one terminal of a conjugated diene-based polymer, and a particular example may be a modifier having affinity with silica. The modifier having affinity with silica may mean a modifier containing a functional group having affinity with silica in a compound used as the modifier, and may mean a functional group having excellent affinity with a filler, particularly, a silica-based filler and capable of making interaction between a silica-based filler and a functional group derived from a modifier.

The modifier according to an embodiment of the present invention is represented by Formula 1 below, which may easily introduce a tertiary amine group which is a functional group having affinity with a filler and may perform modification.

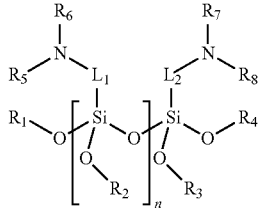

[Formula 1]

In Formula 1, $R_1$ to $R_8$ are each independently an alkyl group of 1 to 20 carbon atoms; $L_1$ and $L_2$ are each independently an alkylene group of 1 to 20 carbon atoms; and n is an integer of 2 to 4.

Particularly, in Formula 1, $R_1$ to $R_4$ may be each independently a substituted or unsubstituted alkyl group of 1 to 20 carbon atoms, and in case where substituted, $R_1$ to $R_4$ may be each independently substituted with one or more substituents selected from the group consisting of an alkyl group of 1 to 10 carbon atoms, a cycloalkyl group of 3 to 10 carbon atoms, an alkoxy group of 1 to 10 carbon atoms, a cycloalkoxy group of 4 to 10 carbon atoms, an aryl group of 6 to 12 carbon atoms, an aryloxy group of 6 to 12 carbon atoms, an alkanoyloxy group of 2 to 12 carbon atoms ($R_aCOO$—, where $R_a$ is an alkyl group of 1 to 9 carbon atoms), an aralkyloxy group of 7 to 13 carbon atoms, an arylalkyl group of 7 to 13 carbon atoms, and an alkylaryl group of 7 to 13 carbon atoms. More particularly, $R_1$ to $R_4$ may be substituted or unsubstituted alkyl groups of 1 to 10 carbon atoms, more particularly, $R_1$ to $R_4$ may be each independently a substituted or unsubstituted alkyl group of 1 to 6 carbon atoms.

Also, in Formula 1, $R_5$ to $R_8$ may be each independently a substituted or unsubstituted alkyl group of 1 to 20 carbon atoms, particularly, a substituted or unsubstituted alkyl group of 1 to 10 carbon atoms, more particularly, a substituted or unsubstituted alkyl group of 1 to 6 carbon atoms. If substituted, $R_5$ to $R_8$ may be substituted with the above-described substituents for $R_1$ to $R_4$. In case where $R_5$ to $R_8$ are not alkyl groups but hydrolysable groups, N—$R_5R_6$ and N—$R_7R_8$ bonds may be hydrolyzed in the presence of water into N—H, thereby adversely affecting the processability of a polymer.

More particularly, the compound represented by Formula 1 may be Formula 1 where $R_1$ to $R_4$ are methyl groups or ethyl groups, and $R_5$ to $R_8$ are alkyl groups of 1 to 10 carbon atoms.

The amino groups included in Formula 1, i.e., —$NR_5R_6$ and —$NR_7R_8$ may preferably be tertiary amino groups. The tertiary amino group allows even better processability in case where the compound of the present invention is used as a modifier.

In case where $R_5$ to $R_8$ are protecting groups for protecting the amino groups or hydrogen, the achievement of the effects according to the present invention may be difficult. In case of being hydrogen, anions may react with the hydrogen during a modification process, thereby losing reactivity and disabling from performing modification reaction itself. In case of being the protecting group, modification reaction may be performed, but during performing a subsequent processing in a state of being combined at the terminal of a polymer, deprotection reaction may be performed due to hydrolysis to produce primary or secondary amino groups. The deprotected primary or secondary amino groups may induce fragmentation phenomenon of a compounded mixture during compounding and may be a factor of degrading processability.

Also, in Formula 1, $L_1$ and $L_2$ may be each independently a substituted or unsubstituted alkylene group of 1 to 20 carbon atoms. More particularly, $L_1$ and $L_2$ may be each independently an alkylene group of 1 to 10 carbon atoms, more particularly, an alkylene group of 1 to 6 carbon atoms such as a methylene group, an ethylene group and a propylene group.

The closer the distance between an Si atom and an N atom in a molecule, better effects may be shown, but in case where Si and N are directly bonded, this bond is liable to break. As a result, the bond between Si and N may be broken during a subsequent process, and there is high probability of losing a secondary amino group produced thereby by water during a subsequent treatment. In addition, in a modified conjugated diene-based polymer finally prepared, coupling with a silica filler is difficult due to the absence of an amino group which promotes the bonding with the silica filler, and as a result, the dispersing effects of a dispersant may be degraded. As described above, considering the excellent improving effects according to the bond length between Si and N, $L_1$ and $L_2$ may more preferably be each independently an alkylene group of 1 to 3 carbon atoms such as a methylene group, an ethylene group and a propylene group, more particularly, a propylene group. Also, $L_1$ and $L_2$ may be substituted with the substituents explained referring to $R_1$ to $R_4$.

More particularly, the compound represented by Formula 1 may be one or more selected from the group consisting of the compounds represented by Formula 1a to Formula 1e below.

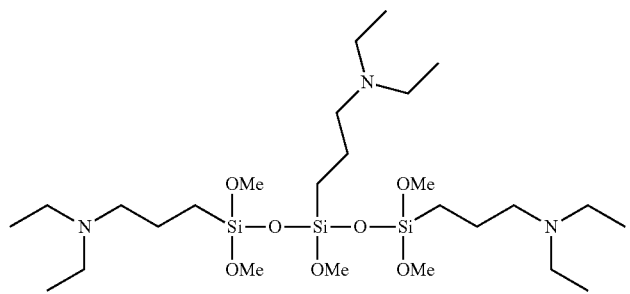
[Formula 1a]
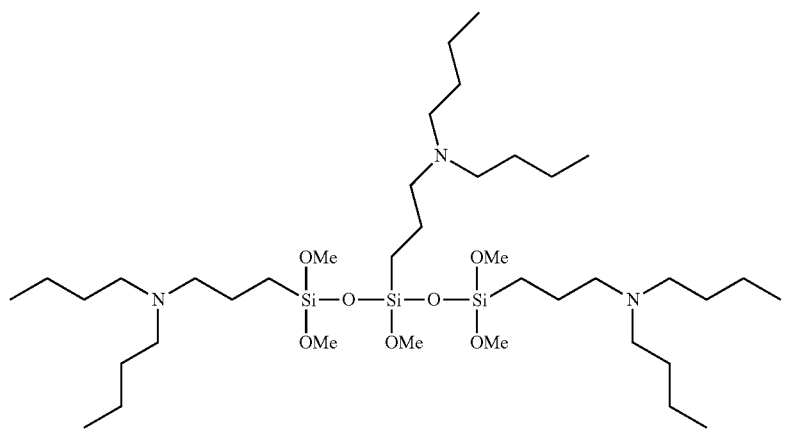
[Formula 1b]
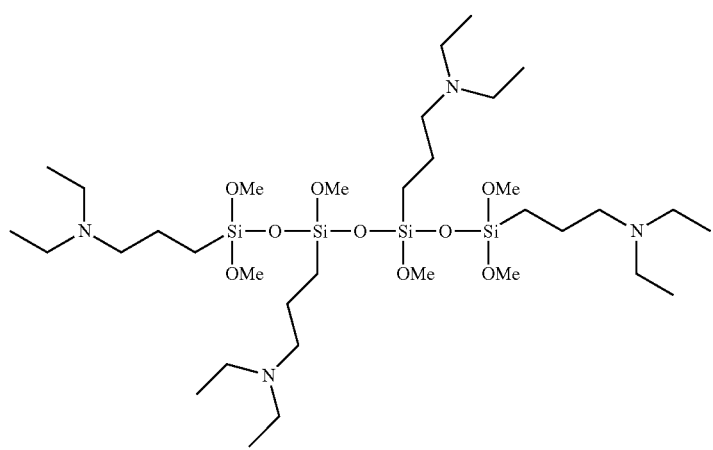
[Formula 1c]
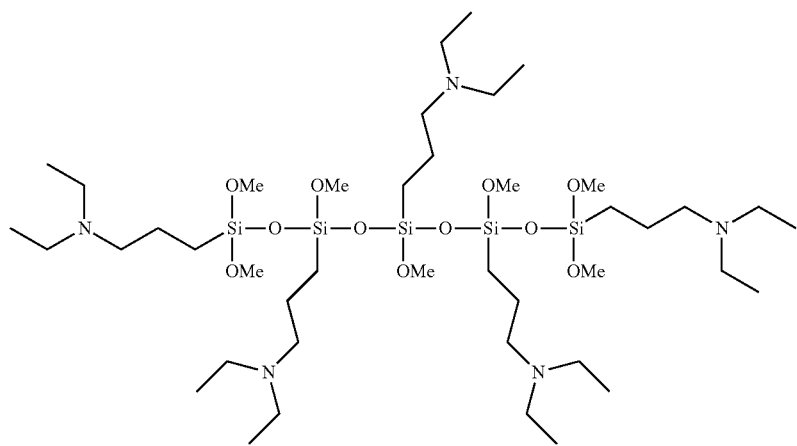
[Formula 1d]

-continued

[Formula 1e]

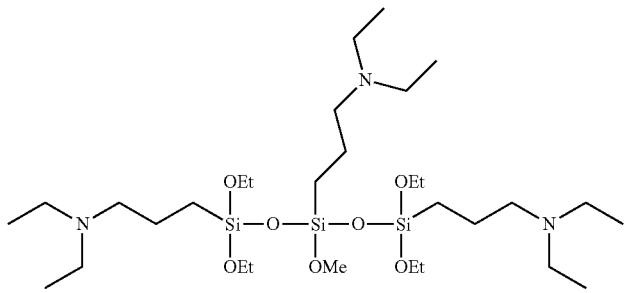

In Formula 1a to Formula 1e, Me is a methyl group, and Et is an ethyl group.

In the modifier of the present invention, in the compound represented by Formula 1, an alkoxysilane structure is combined with the activated terminal of a conjugated diene-based polymer, and meanwhile, a Si—O—Si structure and three or more amino groups combined at the terminal show affinity with a filler such as silica, and accordingly, the coupling of a filler with a modified conjugated diene-based polymer may be promoted when compared with the conventional modifier including one amino group in a molecule. Also, since the coupling degree of the activated terminal of the conjugated diene-based polymer is uniform, if observing the change of molecular weight distribution before and after coupling, the molecular weight distribution is not increased but constant after coupling in comparison to before coupling. As a result, the physical properties of the modified conjugated diene-based polymer itself are not degraded, agglomeration of the filler in a rubber composition may be prevented, and the dispersibility of a filler is increased, thereby improving the processability of a rubber composition, particularly, improving the fuel consumption properties, abrasion properties and braking properties of tires in balance.

The modifier represented by Formula 1 may be prepared through condensation reaction represented by Reaction 1 below.

[Reaction 1]

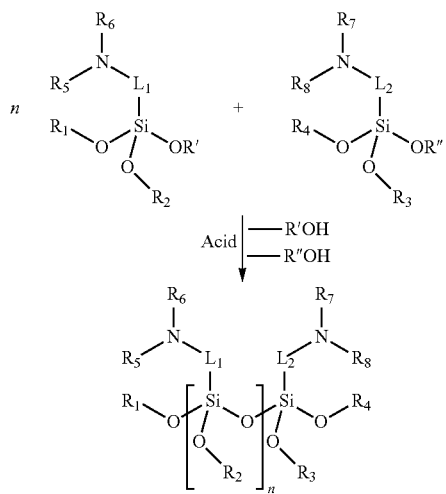

In Reaction 1, $R_1$ to $R_8$, $L_1$ to $L_2$, and n are the same as defined in Formula 1, R' and R" are optional substituents not affecting the condensation reaction. For example, R' and R" may be each independently the same as any one among $R_1$ to $R_4$.

The reaction is performed under acid conditions, and any acids used for condensation reaction may be used without limitation. A person skilled in the art could select an optimal acid according to various process variables including the type of a reactor performing the reaction, starting materials, reaction temperature, etc.

Meanwhile, the modification initiator according to an embodiment of the present invention may be one or more compounds selected from the group consisting of: a compound represented by Formula 2a below; a reaction product of a compound selected from the compounds represented by Formula 2b to Formula 2e below with an organometallic compound; and a compound represented by Formula 2f below.

For example, the compound represented by Formula 2a below may be applied as a modification initiator without the reaction with an organometallic compound and may be a compound represented below.

[Formula 2a]

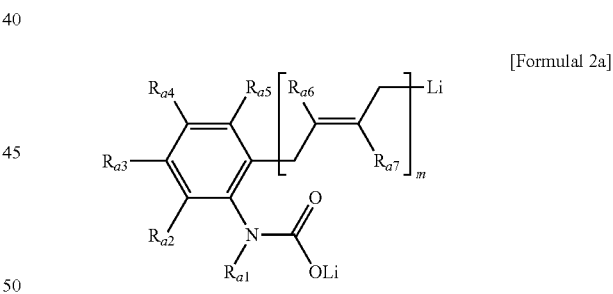

In Formula 2a, $R_{a1}$ to $R_{a7}$ are each independently a hydrogen atom; an alkyl group of 1 to 20 carbon atoms; a cycloalkyl group of 3 to 20 carbon atoms; an aryl group of 6 to 20 carbon atoms; an arylalkyl group of 7 to 20 carbon atoms; an alkylaryl group of 7 to 20 carbon atoms; or a heteroatom-containing alkyl group of 1 to 20 carbon atoms, and m is an integer of 0 to 3.

Particularly, in Formula 2a, $R_{a1}$ to $R_{a7}$ may be each independently a hydrogen atom; an alkyl group of 1 to 20 carbon atoms; a cycloalkyl group of 3 to 20 carbon atoms; an aryl group of 6 to 20 carbon atoms; an arylalkyl group of 7 to 20 carbon atoms; an alkylaryl group of 7 to 20 carbon atoms; an alkoxy group of 1 to 20 carbon atoms; an alkoxyalkyl group of 2 to 20 carbon atoms; an aryloxy group of 6 to 20 carbon atoms; or an aryloxyalkyl group of 7 to 20 carbon atoms.

More particularly, in Formula 2a, $R_{a1}$ may be an alkyl group of 1 to 10 carbon atoms, more preferably, an alkyl group of 1 to 5 carbon atoms, and $R_{a2}$ to $R_{a7}$ may be each independently a hydrogen atom or an alkyl group of 1 to 10 carbon atoms, preferably, a hydrogen atom or an alkyl group of 1 to 5 carbon atoms.

More preferably, the modification initiator represented by Formula 2a may be a compound represented by Formula 2aa below.

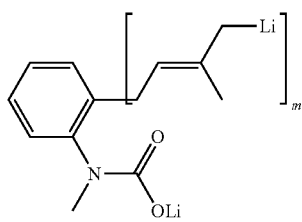

[Formula 2aa]

In Formula 2aa, m is an integer of 0 to 3.

In another embodiment, the compound represented by Formula 2b below may be applied as a compound type produced through the reaction with an organometallic compound and may be a compound represented below.

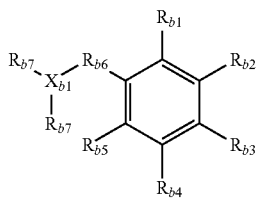

[Formula 2b]

In Formula 2b, $X_{b1}$ is N or O, and in case where $X_{b1}$ is O, $R_{b7}$ or $R_{b8}$ is not present, $R_{b1}$ to $R_{b5}$ are each independently a hydrogen atom; an alkyl group of 1 to 20 carbon atoms; a cycloalkyl group of 3 to 20 carbon atoms; an aryl group of 6 to 20 carbon atoms; an arylalkyl group of 7 to 20 carbon atoms; or an alkylaryl group of 7 to 20 carbon atoms; or adjacent two substituents may be connected to form one aliphatic or aromatic ring, $R_{b6}$ is a single bond; or an alkylene group of 1 to 12 carbon atoms, and $R_{b7}$ and $R_{b8}$ are each independently an alkyl group of 1 to 14 carbon atoms or an aryl group of 6 to 14 carbon atoms.

Particularly, in the compound represented by Formula 2b, $X_{b1}$ is N or O, and in case where $X_{b1}$ is O, $R_{b7}$ or $R_{b8}$ is not present, $R_{b1}$ to $R_{b5}$ are each independently a hydrogen atom or an alkyl group of 1 to 10 carbon atoms, $R_{b6}$ is a single bond; or an alkylene group of 1 to 6 carbon atoms, and $R_{b7}$ and $R_{b8}$ are each independently an alkyl group of 1 to 10 carbon atoms.

More particularly, the compound represented by Formula 2b may be a compound represented by Formula 2ba to Formula 2bd below.

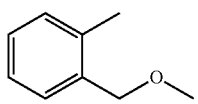

[Formula 2ba]

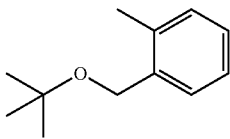

[Formula 2bb]

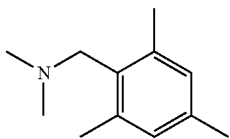

[Formula 2bc]

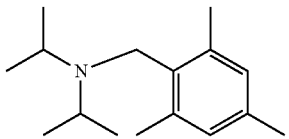

[Formula 2bd]

In another embodiment, the compound represented by Formula 2c below may be applied as a compound type produced through the reaction with an organometallic compound and may be a compound represented below.

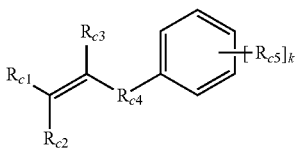

[Formula 2c]

In Formula 2c, $R_{c1}$ to $R_{c3}$ may be each independently a hydrogen atom; an alkyl group of 1 to 30 carbon atoms; an alkenyl group of 2 to 30 carbon atoms; an alkynyl group of 2 to 30 carbon atoms; a heteroalkyl group of 1 to 20 carbon atoms, a heteroalkenyl group of 2 to 30 carbon atoms; a heteroalkynyl group of 2 to 30 carbon atoms; a cycloalkyl group of 5 to 30 carbon atoms; an aryl group of 6 to 30 carbon atoms; or a heterocyclic group of 3 to 30 carbon atoms.

$R_{c4}$ may be a single bond, or an alkylene group of 1 to 20 carbon atoms; a a cycloalkylene group of 5 to 20 carbon atoms; or an arylene group of 6 to 20 carbon atoms, each of which is unsubstituted or substituted with a substituent, where the substituent may be an alkyl group of 1 to 10 carbon atoms, a cycloalkyl group of 5 to 10 carbon atoms, or an aryl group of 6 to 20 carbon atoms.

$R_{c5}$ may be an alkyl group of 1 to 30 carbon atoms; an alkenyl group of 2 to 30 carbon atoms; an alkynyl group of 2 to 30 carbon atoms; a heteroalkyl group of 1 to 30 carbon atoms; a heteroalkenyl group of 2 to 30 carbon atoms; a heteroalkynyl group of 2 to 30 carbon atoms; a cycloalkyl group of 5 to 30 carbon atoms; an aryl group of 6 to 30 carbon atoms; a heterocyclic group of 3 to 30 carbon atoms; or a functional group represented by Formula 2c-1 or Formula 2c-2 below, and k may be an integer of 1 to 5, at least one $R_{c5}$ may be a functional group represented by Formula 2c-1 or Formula 2c-2, and in case where k is an integer of 2 to 5, multiple $R_{c5}$ may be the same or different.

[Formula 2c-1]

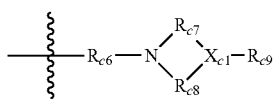

In Formula 2c-1, $R_{c6}$ is an alkylene group of 1 to 20 carbon atoms; a cycloalkylene group of 5 to 20 carbon atoms; or an arylene group of 6 to 20 carbon atoms, each of which is unsubstituted or substituted with a substituent, where the substituent is an alkyl group of 1 to 10 carbon atoms, a cycloalkyl group of 5 to 10 carbon atoms, or an aryl group of 6 to 20 carbon atoms, $R_{c7}$ and $R_{c8}$ are each independently an alkylene group of 1 to 20 carbon atoms, which is substituted with an alkyl group of 1 to 10 carbon atoms, a cycloalkyl group of 5 to 10 carbon atoms, or an aryl group of 6 to 20 carbon atoms, or unsubstituted, $R_{c9}$ is a hydrogen atom; an alkyl group of 1 to 30 carbon atoms; an alkenyl group of 2 to 30 carbon atoms; an alkynyl group of 2 to 30 carbon atoms; a heteroalkyl group of 1 to 30 carbon atoms; a heteroalkenyl group of 2 to 30 carbon atoms; a heteroalkynyl group of 2 to 30 carbon atoms; a cycloalkyl group of 5 to 30 carbon atoms; an aryl group of 6 to 30 carbon atoms; or a heterocyclic group of 3 to 30 carbon atoms, and $X_{c1}$ is an N, O or S atom, in case where $X_{c1}$ is O or S, $R_{c9}$ may not be present.

[Formula 2c-2]

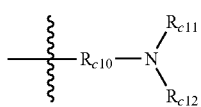

In Formula 2c-2, $R_{c10}$ is an alkylene group of 1 to 20 carbon atoms; a cycloalkylene group of 5 to 20 carbon atoms; or an arylene group of 6 to 20 carbon atoms, each of which is unsubstituted or substituted with a substituent, where the substituent is an alkyl group of 1 to 10 carbon atoms, a cycloalkyl group of 5 to 10 carbon atoms, or an aryl group of 6 to 20 carbon atoms, and $R_{c11}$ and $R_{c12}$ may be each independently an alkyl group of 1 to 30 carbon atoms; an alkenyl group of 2 to 30 carbon atoms; an alkynyl group of 2 to 30 carbon atoms; a heteroalkyl group of 1 to 30 carbon atoms; a heteroalkenyl group of 2 to 30 carbon atoms; a heteroalkynyl group of 2 to 30 carbon atoms; a cycloalkyl group of 5 to 30 carbon atoms; an aryl group of 6 to 30 carbon atoms; or a heterocyclic group of 3 to 30 carbon atoms.

Particularly, in the compound represented by Formula 2c, $R_{c1}$ to $R_{c3}$ may be each independently a hydrogen atom; an alkyl group of 1 to 10 carbon atoms; an alkenyl group of 2 to 10 carbon atoms; or an alkynyl group of 2 to 10 carbon atoms, $R_{c4}$ may be a single bond; or an alkylene group of 1 to 10 carbon atoms, which is unsubstituted or substituted with a substituent, $R_{c5}$ may be an alkyl group of 1 to 10 carbon atoms; an alkenyl group of 2 to 10 carbon atoms; an alkynyl group of 2 to 10 carbon atoms; or a functional group represented by Formula 2c-1 or Formula 2c-2, in Formula 2c-1, $R_{c6}$ may be an unsubstituted alkylene group of 1 to 10 carbon atoms, $R_{c7}$ and $R_{c8}$ may be each independently an unsubstituted alkylene group of 1 to 10 carbon atoms, $R_{c9}$ may be an alkyl group of 1 to 10 carbon atoms; a cycloalkyl group of 5 to 20 carbon atoms; an aryl group of 6 to 20 carbon atoms; or a heterocyclic group of 3 to 20 carbon atoms, and in Formula 2c-2, $R_{c10}$ is an unsubstituted alkylene group of 1 to 10 carbon atoms, and $R_{c11}$ and $R_{c12}$ may be each independently an alkyl group of 1 to 10 carbon atoms; a cycloalkyl group of 5 to 20 carbon atoms; an aryl group of 6 to 20 carbon atoms; or a heterocyclic group of 3 to 20 carbon atoms.

More particularly, the compound represented by Formula 2c may be a compound represented by Formula 2ca to Formula 2cc below.

[Formula 2ca]

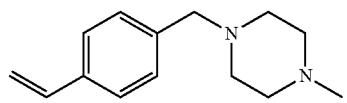

[Formula 2cb]

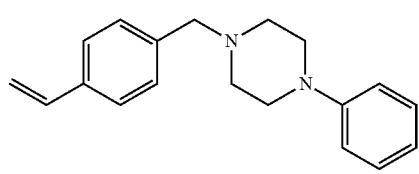

[Formula 2cc]

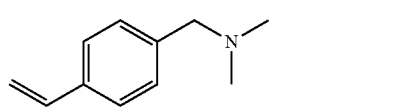

In another embodiment, the compound represented by Formula 2d below may be applied as a compound type produced through the reaction with an organometallic compound and may be a compound represented below.

[Formula 2d]

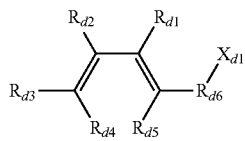

In Formula 2d, $R_{d1}$ to $R_{d5}$ are each independently a hydrogen atom; an alkyl group of 1 to 30 carbon atoms; an alkenyl group of 2 to 30 carbon atoms; an alkynyl group of 2 to 30 carbon atoms; a heteroalkyl group of 1 to 30 carbon atoms, a heteroalkenyl group of 2 to 30 carbon atoms; a heteroalkynyl group of 2 to 30 carbon atoms; a cycloalkyl group of 5 to 30 carbon atoms; an aryl group of 6 to 30 carbon atoms; or a heterocyclic group of 3 to 30 carbon atoms, $R_{d6}$ is an alkylene group of 1 to 20 carbon atoms, which is substituted with an alkyl group of 1 to 30 carbon atoms; an alkenyl group of 2 to 30 carbon atoms; an alkynyl group of 2 to 30 carbon atoms; a heteroalkyl group of 1 to 30 carbon atoms, a heteroalkenyl group of 2 to 30 carbon atoms; a heteroalkynyl group of 2 to 30 carbon atoms; a cycloalkyl group of 5 to 30 carbon atoms; an aryl group of 6 to 30 carbon atoms; or a heterocyclic group of 3 to 30 carbon atoms or unsubstituted, and $X_{d1}$ may be a functional group represented by Formula 2d-1 or Formula 2d-2 below.

[Formula 2d-1]

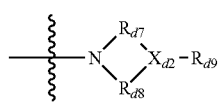

In Formula 2d-1, $R_{d7}$ and $R_{d8}$ are each independently an alkylene group of 1 to 20 carbon atoms, which is substituted with an alkyl group of 1 to 10 carbon atoms, a cycloalkyl group of 5 to 10 carbon atoms, or an aryl group of 6 to 20 carbon atoms or unsubstituted, $R_{d9}$ is a hydrogen atom; an alkyl group of 1 to 30 carbon atoms; an alkenyl group of 2 to 30 carbon atoms; an alkynyl group of 2 to 30 carbon atoms; a heteroalkyl group of 1 to 30 carbon atoms; a heteroalkenyl group of 2 to 30 carbon atoms; a heteroalkynyl group of 2 to 30 carbon atoms; a cycloalkyl group of 5 to 30 carbon atoms; an aryl group of 6 to 30 carbon atoms; or a heterocyclic group of 3 to 30 carbon atoms, and $X_{d2}$ is N, O or S, in case where $X_{d2}$ is O or S, $R_{d9}$ may not be not present.

[Formula 2d-2]

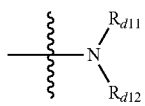

In Formula 2d-2, $R_{d11}$ and $R_{d12}$ may be each independently an alkyl group of 1 to 30 carbon atoms; an alkenyl group of 2 to 30 carbon atoms; an alkynyl group of 2 to 30 carbon atoms; a heteroalkyl group of 1 to 30 carbon atoms; a heteroalkenyl group of 2 to 30 carbon atoms; a heteroalkynyl group of 2 to 30 carbon atoms, a cycloalkyl group of 5 to 30 carbon atoms; an aryl group of 6 to 30 carbon atoms; or a heterocyclic group of 3 to 30 carbon atoms.

Particularly, in the compound represented by Formula 2d, $R_{d1}$ to $R_{d5}$ may be each independently a hydrogen atom; an alkyl group of 1 to 10 carbon atoms; an alkenyl group of 2 to 10 carbon atoms; or an alkynyl group of 2 to 10 carbon atoms, $R_{d6}$ may be an unsubstituted alkylene group of 1 to 10 carbon atoms, and $X_{d1}$ may be a functional group represented by Formula 2d-1 or Formula 2d-2, in Formula 2d-1, $R_{d7}$ and $R_{d8}$ may be each independently an unsubstituted alkylene group of 1 to carbon atoms, $R_{d9}$ is an alkyl group of 1 to 10 carbon atoms; a cycloalkyl group of 5 to 20 carbon atoms; an aryl group of 6 to 20 carbon atoms; or a heterocyclic group of 3 to 20 carbon atoms, and $X_{d2}$ is N, and in Formula 2d-2, $R_{d11}$ and $R_{d12}$ may be each independently an alkyl group of 1 to 10 carbon atoms; a cycloalkyl group of 5 to 20 carbon atoms; an aryl group of 6 to 20 carbon atoms; or a heterocyclic group of 3 to 20 carbon atoms.

More particularly, the compound represented by Formula 2d may be a compound represented by Formula 2da or Formula 2db below.

[Formula 2da]

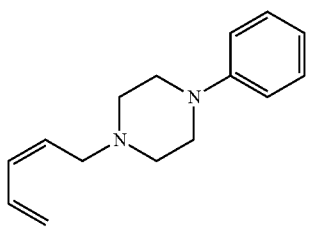

[Formula 2db]

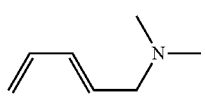

In case of selecting the compound represented by Formula 2b to Formula 2d, pre-treatment of reacting with an organometallic compound may be required, and here, the organometallic compound may be one or more selected from an organolithium compound, an organosodium compound, an organopotassium compound, an organorubidium compound and an organocesium compound. Particularly, the organometallic compound may be one or more selected from methyllithium, ethyllithium, isopropyllithium, n-butyllithium, sec-butyllithium, tert-butyllithium, n-decyllithium, tert-octyllithium, phenyllithium, 1-naphthyl lithium, n-eicosyl lithium, 4-butylphenyl lithium, 4-tolyl lithium, cyclohexyl lithium, 3,5-di-n-heptylcyclohexyl lithium, and 4-cyclopentyl lithium.

In another embodiment, the compound represented by Formula 2e below may be applied as a compound type produced through the reaction with an organometallic compound and may be a compound represented below.

[Formula 2e]

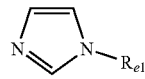

In Formula 2e,
$R_{e1}$ is an alkenyl group of 2 to 10 carbon atoms.
Particularly, the compound represented by Formula 2e may be a compound represented by Formula 2ea below, i.e., 1-vinyl imidazole; 1-vinyl-1H-imidazole.

[Formula 2ea]

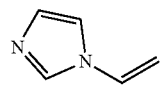

For example, the compound represented by Formula 2f below may be applied as a modification initiator without the reaction with an organometallic compound and may be a compound represented below.

[Formula 2f]

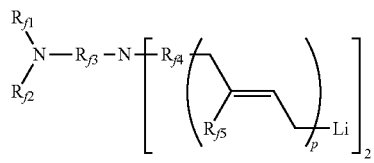

In Formula 2f, $R_{f1}$, $R_{f2}$ and $R_{f5}$ are each independently an alkyl group of 1 to 20 carbon atoms; a cycloalkyl group of 3 to 20 carbon atoms; an aryl group of 6 to 20 carbon atoms; an arylalkyl group of 7 to 20 carbon atoms; or an alkylaryl group of 7 to 20 carbon atoms, $R_{f3}$ and $R_{f4}$ are each independently an alkylene group of 1 to 20 carbon atoms or an arylene group of 6 to 30 carbon atoms, and p is an integer of 1 to 5.

Particularly, in Formula 2f, $R_{f1}$, $R_{f2}$ and $R_{f5}$ may be each independently an alkyl group of 1 to 10 carbon atoms; a cycloalkyl group of 3 to 10 carbon atoms; an aryl group of 6 to 10 carbon atoms; an arylalkyl group of 7 to 10 carbon atoms; or an alkylaryl group of 7 to 10 carbon atoms, $R_{f3}$ and $R_{f4}$ may be each independently an alkylene group of 1 to 10 carbon atoms or an arylene group of 6 to 10 carbon atoms, and p may be an integer of 1 to 3.

More particularly, in Formula 2f, $R_{f1}$, $R_{f2}$ and $R_{f5}$ may be each independently an alkyl group of 1 to 6 carbon atoms, $R_{f3}$ and $R_{f4}$ may be each independently an alkylene group of 1 to 6 carbon atoms, and p may be an integer of 1 to 3.

More particularly, the modification initiator represented by Formula 2f may be a compound represented by Formula 2fa below.

[Formula 2fa]

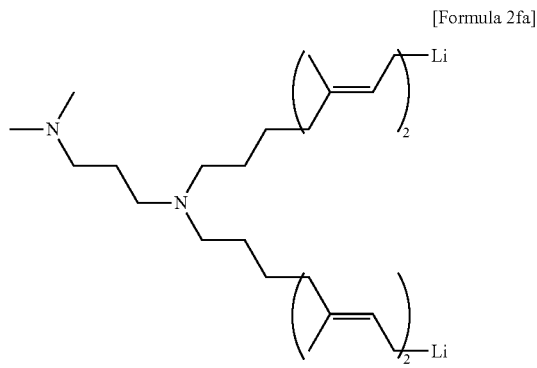

As described above, the modified conjugated diene-based polymer according to an embodiment of the present invention has a specific structure and may have a unique molecular weight distribution diagram and shape. Such a polymer structure may be expressed by physical properties such as a mooney stress relaxation ratio and a coupling number, the molecular weight distribution diagram and shape may be expressed by a PDI value, the shape of a molecular weight distribution curve and a coupling number, and both terminal modification by the modifier and the modification initiator may affect the structure, and the molecular weight distribution diagram and the shape thereof. Parameters expressing such polymer structure and properties related to the molecular weight distribution may be satisfied by a preparation method which will be explained later. Though the preparation through such a preparation method is preferable for satisfying the above-described properties, in case where all the above-described properties are satisfied, effects trying to achieve in the present invention may be accomplished.

Method for Preparing Modified Conjugated Diene-Based Polymer

In addition, the present invention provides a method for preparing the modified conjugated diene-based polymer.

The method for preparing the modified conjugated diene-based polymer according to an embodiment of the present invention includes polymerizing a conjugated diene-based monomer, or a conjugated diene-based monomer and an aromatic vinyl-based monomer in the presence of a modification initiator in a hydrocarbon solvent to prepare an active polymer which introduces a functional group derived from the modification initiator (S1); and reacting or coupling the active polymer prepared in step (S1) with a modifier represented by Formula 1 below (S2), wherein step (S1) is continuously performed in two or more polymerization reactors, and a polymerization conversion ratio in a first reactor among the polymerization reactors may be 50% or less.

[Formula 1]

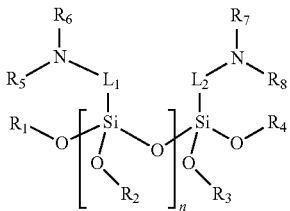

In Formula 1, each substituent and index are the same as defined above.

The hydrocarbon solvent is not specifically limited, but may be, for example, one or more selected from the group consisting of n-pentane, n-hexane, n-heptane, isooctane, cyclohexane, toluene, benzene and xylene.

In addition, the conjugated diene-based monomer and the aromatic vinyl monomer are the same as defined above.

According to an embodiment of the present invention, the modification initiator may be used in 0.01 mmol to 10 mmol, 0.05 mmol to 5 mmol, 0.1 mmol to 2 mmol, 0.1 mmol to 1 mmol, or 0.15 to 0.8 mmol based on total 100 g of the monomer.

The polymerization of step (S1) may be, for example, an anionic polymerization, and particularly, a living anionic polymerization by which an anionic active part is formed at the polymerization terminal through a propagation reaction by anions. In addition, the polymerization of step (S1) may be polymerization with heating, isothermal polymerization, or polymerization at a constant temperature (adiabatic polymerization). Here, the polymerization at a constant temperature means a polymerization method including a step of polymerizing using self-generated heat of reaction without optionally applying heat after adding a polymerization initiator, and the polymerization with heating means a polymerization method including injecting the polymerization initiator and then, increasing the temperature by optionally applying heat. The isothermal polymerization means a polymerization method by which the temperature of a polymer is kept constant by increasing heat by applying heat or taking heat after adding the polymerization initiator.

In addition, according to an embodiment of the present invention, the polymerization of step (S1) may be performed by further including a diene-based compound of 1 to 10 carbon atoms in addition to the conjugated diene-based monomer, and in this case, effects of preventing the formation of gel on the wall of a reactor during operation for a long time may be achieved. The diene-based compound may include, for example, 1,2-butadiene.

The polymerization of step (S1) may be conducted in a temperature range of 80° C. or less, −20° C. to 80° C., 0° C. to 80° C., 0° C. to 70° C., or 10° C. to 70° C. Within the range, the molecular weight distribution of a polymer is controlled narrow, and the improving effects of physical properties are excellent.

The active polymer prepared by step (S1) may mean a polymer in which a polymer anion and an organometallic cation are coupled.

According to an embodiment of the present invention, the method for preparing the modified conjugated diene-based polymer may be performed in a plurality of reactors including two or more polymerization reactors and a modification reactor by a continuous type polymerization method. In a particular embodiment, step (S1) may be performed continuously in two or more polymerization reactors including a first reactor, and the number of the polymerization reactors may be flexibly determined according to reaction conditions and environment. The continuous type polymerization method may mean reaction processes of continuously supplying reactants to a reactor and continuously discharging reaction products thus produced. By the continuous type polymerization method, productivity and processability may be excellent, and effect of excellent uniformity of the polymer thus prepared may be achieved.

In addition, according to an embodiment of the present invention, if the active polymer is continuously prepared in the polymerization reactor, a polymerization conversion ratio in the first reactor may be 50% or less, from 10% to 50%, or from 20% to 50%, and within this range, side reactions generated while forming a polymer after initiating polymerization reaction may be restrained and a polymer with a linear structure may be induced during polymerization. Thus, the molecular weight distribution of the polymer may be controlled narrow, and effects of excellent improvement of physical properties may be achieved.

In this case, the polymerization conversion ratio may be controlled according to the reaction temperature, the retention time in the reactor, etc.

The polymerization conversion ratio may be determined, for example, by measuring the solid concentration in a polymer solution phase including the polymer during polymerizing a polymer. In a particular embodiment, in order to secure the polymer solution, a cylinder type container is installed at the outlet of each polymerization reactor to fill a certain amount of the polymer solution in the cylinder type container. Then, the cylinder type container is separated from the reactor, the weight (A) of the cylinder filled with the polymer solution is measured, the polymer solution filled in the cylinder type container is transported to an aluminum container, for example, an aluminum dish, the weight (B) of the cylinder type container from which the polymer solution is removed is measured, the aluminum container containing the polymer solution is dried in an oven of 140° C. for 30 minutes, the weight (C) of a dried polymer is measured, and calculation is performed according to the following Mathematical Equation 1:

[Mathematical Equation 1]

$$\text{Polymerization conversion ratio (\%)} = \frac{\text{Weight}(C)}{[(\text{Weight}(A) - \text{Weight}(B)) \times \text{total solid content of each reactor(wt\%, } TSC)]} \times 100$$

Meanwhile, the polymer polymerized in the first reactor may be transported to polymerization reactors before a modification reactor in order, and polymerization may be performed until the final polymerization conversion ratio becomes 95% or more. After performing the polymerization in the first reactor, the polymerization conversion ratios of the second reactor, or each reactor from the second reactor to the polymerization reactor before the modification reactor may be appropriately controlled to control molecular weight distribution.

Meanwhile, in step (S1), during preparing an active polymer, the retention time of a polymer in the first reactor may be from 1 minute to 40 minutes, from 1 minute to 30 minutes, or from 5 minutes to 30 minutes, and within this range, the control of a polymerization conversion ratio is easy, and thus, the molecular weight distribution of a polymer is possibly controlled narrow, and effects of improving physical properties may be excellent.

The term "polymerization reactant" used in the present invention may mean an intermediate of a polymer type, which is under polymerization in each reactor during performing step (S1) or may mean a polymer with a polymerization conversion ratio of less than 95% under polymerization in a reactor, after finishing step (S1) or step (S2) and prior to obtaining an active polymer or a modified conjugated diene-based polymer.

According to an embodiment of the present invention, the molecular weight distribution (PDI, polydispersed index; MWD, Mw/Mn) of the active polymer prepared in step (S1) may be less than 1.5, from 1.0 to less than 1.5, or from 1.1 to less than 1.5, and within this range, the molecular weight distribution of a modified conjugated diene-based polymer which is prepared via a modification reaction or coupling with a modifier is narrow, and improving effects of physical properties may be excellent.

Meanwhile, the polymerization of step (S1) may be performed by including a polar additive, and the polar additive may be added in a ratio of 0.001 g to 50 g, 0.001 g to 10 g, or 0.005 g to 0.1 g based on total 100 g of the monomer. In another embodiment, the polar additive may be added in a ratio of 0.001 g to 10 g, 0.005 g to 5 g, or 0.005 g to 4 g based on total 1 mmol of the polymerization initiator.

The polar additive may be, for example, one or more selected from the group consisting of tetrahydrofuran, 2,2-di(2-tetrahydrofuryl)propane, diethyl ether, cyclopentyl ether, dipropyl ether, ethylene methyl ether, ethylene dimethyl ether, diethyl glycol, dimethyl ether, tert-butoxy ethoxy ethane, bis(3-dimethylaminoethyl) ether, (dimethylaminoethyl) ethyl ether, trimethylamine, triethylamine, tripropylamine, N,N,N',N'-tetramethylethylenediamine, sodium metholate, and 2-ethyl tetrahydrofufuryl ether, and may preferably be 2,2-di(2-tetrahydrofuryl)propane, triethylamine, tetramethylethylenediamine, sodium mentholate, or 2-ethyl tetrahydrofufuryl ether. If the polar additive is included, and if a conjugated diene-based monomer, or a conjugated diene-based monomer and an aromatic vinyl-based monomer are copolymerized, the difference of their reaction rates may be compensated, and effects of inducing easy formation of a random copolymer may be achieved.

According to an embodiment of the present invention, the reaction or coupling of step (S2) may be performed in a modification reactor, and in this case, the modifier may be used in an amount of 0.01 mmol to 10 mmol based on total 100 g of the monomer. In another embodiment, the modifier may be used in a molar ratio of 1:0.1 to 10, 1:0.1 to 5, or 1:0.1 to 1:3, based on 1 mol of the polymerization initiator of step (S1).

In addition, according to an embodiment of the present invention, the modifier may be injected into a modification reactor, and step (S2) may be conducted in the modification reactor. In another embodiment, the modifier may be injected into a transporting part for transporting the active polymer prepared in step (S1) to a modification reactor for conducting step (S2), and the reaction or coupling may be performed by the mixing of the active polymer and the modifier in the transporting part.

The method for preparing a modified conjugated diene-based polymer according to an embodiment of the present invention is a method satisfying the properties of the above-described modified conjugated diene-based polymer. Effects intended to achieve in the present invention may be achieved if the above properties are satisfied as described above, but in at least in the preparation method, a polymerization conversion ratio during transporting from the first reactor to the second reactor is required to be satisfied and by controlling other polymerization conditions diversely, the physical properties of the modified conjugated diene-based polymer according to the present invention may be accomplished.

Rubber Composition

Also, the present invention provides a rubber composition including the modified conjugated diene-based polymer.

The rubber composition may include the modified conjugated diene-based polymer in an amount of 10 wt % or more, 10 wt % to 100 wt %, or 20 wt % to 90 wt %, and within this range, mechanical properties such as tensile strength and abrasion resistance are excellent, and effect of excellent balance between physical properties may be achieved.

In addition, the rubber composition may further include other rubber components, as necessary, in addition to the modified conjugated diene-based polymer, and in this case, the rubber component may be included in an amount of 90 wt % or less based on the total weight of the rubber composition. In a particular embodiment, the rubber component may be included in an amount of 1 part by weight to 900 parts by weight based on 100 parts by weight of the modified conjugated diene-based polymer.

The rubber component may be, for example, a natural rubber or a synthetic rubber, and may particularly be a natural rubber (NR) including cis-1,4-polyisoprene; a modified natural rubber which is obtained by modifying or purifying a common natural rubber, such as an epoxidized natural rubber (ENR), a deproteinized natural rubber (DPNR), and a hydrogenated natural rubber; and a synthetic rubber such as a styrene-butadiene copolymer (SBR), a polybutadiene (BR), a polyisoprene (IR), a butyl rubber (IIR), an ethylene-propylene copolymer, a polyisobutylene-co-isoprene, a neoprene, a poly(ethylene-co-propylene), a poly(styrene-co-butadiene), a poly(styrene-co-isoprene), a poly(styrene-co-isoprene-co-butadiene), a poly(isoprene-co-butadiene), a poly(ethylene-co-propylene-co-diene), a polysulfide rubber, an acryl rubber, a urethane rubber, a silicone rubber, an epichlorohydrin rubber, and a halogenated butyl rubber, and any one or a mixture two or more thereof may be used.

The rubber composition may include a filler in 0.1 parts by weight to 200 parts by weight, or 10 parts by weight to 120 parts by weight based on 100 parts by weight of the modified conjugated diene-based polymer of the present invention. The filler may be, for example, a silica-based filler, particularly, wet silica (hydrated silicate), dry silica (anhydrous silicate), calcium silicate, aluminum silicate, or colloid silica. Preferably, the filler may be wet silica which has the most significant improving effect of destruction characteristics and compatible effect of wet grip. In addition, the rubber composition may further include a carbon-based filler, if needed.

In another embodiment, if silica is used as the filler, a silane coupling agent may be used together for the improvement of reinforcing and low exothermic properties. Particular examples of the silane coupling agent may include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl) tetrasulfide, 3-mercaptopropyldimethoxymethylsilane, dimethoxymethylsilylpropyl-N,N-dimethylthiocarbamoyltetrasulfide, or dimethoxymethylsilylpropylbenzothiazolyltetrasulfide, and any one or a mixture of two or more thereof may be used. Preferably, bis(3-triethoxysilylpropyl) polysulfide or 3-trimethoxysilylpropylbenzothiazyltetrasulfide may be used in consideration of the improving effect of reinforcing properties.

In addition, in the rubber composition according to an embodiment of the present invention, since a modified conjugated diene-based polymer in which a functional group having high affinity with silica is brought in an active part is used as a rubber component, the mixing amount of the silane coupling agent may be smaller than a common case. Thus, the silane coupling agent may be used in an amount of 1 part by weight to 20 parts by weight, or 5 parts by weight to 15 parts by weight based on 100 parts by weight of silica. Within the above amount range, effects as a coupling agent may be sufficiently exhibited, and preventing effects of gelation of a rubber component may be achieved.

The rubber composition according to an embodiment of the present invention may be sulfur crosslinkable, and so may further include a vulcanizing agent. The vulcanizing agent may particularly be a sulfur powder and may be included in an amount of 0.1 parts by weight to 10 parts by weight based on 100 parts by weight of a rubber component. Within the above amount range, elasticity and strength required for a vulcanized rubber composition may be secured, and at the same time, an excellent low fuel consumption ratio may be achieved.

The rubber composition according to an embodiment of the present invention may further include various additives used in a common rubber industry in addition to the above components, particularly, a vulcanization accelerator, a process oil, an antioxidant, a plasticizer, an antiaging agent, a scorch preventing agent, a zinc white, stearic acid, a thermosetting resin, or a thermoplastic resin.

The vulcanization accelerator may include, for example, thiazole-based compounds such as 2-mercaptobenzothiazole (M), dibenzothiazyldisulfide (DM), and N-cyclohexyl-2-benzothiazylsulfenamide (CZ), or guanidine-based compounds such as diphenylguanidine (DPG), in an amount of 0.1 parts by weight to 5 parts by weight based on 100 parts by weight of the rubber component.

The process oil acts as a softener in a rubber composition and may include, for example, a paraffin-based, naphthene-based, or aromatic compound. An aromatic process oil may be used in consideration of tensile strength and abrasion resistance, and a naphthene-based or paraffin-based process oil may be used in consideration of hysteresis loss and properties at a low temperature. The process oil may be included in an amount of 100 parts by weight or less based on 100 parts by weight of the rubber component. Within the above-described range, the deterioration of the tensile strength and low exothermic properties (low fuel consumption ratio) of the vulcanized rubber may be prevented.

The antioxidant may include, for example, 2,6-di-t-butyl paracresol, dibutylhydroxytoluenyl, 2,6-bis((dodecylthio) methyl)-4-nonylphenol or 2-methyl-4,6-bis((octylthio)

methyl)phenol, and may be used in an amount of 0.1 parts by weight to 6 parts by weight based on 100 parts by weight of a rubber component.

The antiaging agent may include, for example, N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a condensate of diphenylamine and acetone at a high temperature, in an amount of 0.1 parts by weight to 6 parts by weight based on 100 parts by weight of the rubber component.

The rubber composition according to an embodiment of the present invention may be obtained by mulling using a mulling apparatus such as a banbury mixer, a roll, and an internal mixer according to a mixing prescription. A rubber composition having low exothermic properties and good abrasion properties may be obtained by a vulcanization process after a molding process.

Therefore, the rubber composition may be useful to the manufacture of each member of a tire such as a tire tread, an under tread, a side wall, a carcass coating rubber, a belt coating rubber, a bead filler, a chafer, and a bead coating rubber, or to the manufacture of rubber products in various industries such as a vibration-proof rubber, a belt conveyor, and a hose.

Also, the present invention provides a tire manufactured using the rubber composition.

The tire may be a tire or include a tire tread.

EXAMPLES

Hereinafter, the present invention will be explained in detail referring to embodiments. Embodiments according to the present invention may be modified into various other types, and the scope of the present invention should not be limited to the embodiments described below. The embodiments of the present invention are provided for completely explaining the present invention to a person having an average knowledge in the art.

Preparation Example 1

(1) Preparation of Compound Represented by Formula 2Aa-1

10.11 ml (91.46 mmol) of N-methylaniline was dissolved in 284 ml of methyl t-butyl ether (MTBE), and the temperature was reduced to −20° C., and then, 42.83 ml (23 wt %, 105.18 mmol) of a n-butyllithium hexane solution was slowly added thereto. The reaction solution was stirred for about 180 minutes while slowly elevating the temperature to room temperature. If the reaction solution was changed into pale yellow, the temperature was reduced to −20° C. again, and carbon dioxide was injected for about 20 minutes, followed by stirring for about one hour while elevating the temperature to room temperature to prepare a reaction product in a white slurry state. The temperature was reduced to −20° C. again, and 9.27 ml (114.33 mmol) of tetrahydrofuran (THF) and 62.4 ml (18 wt %, 114.33 mmol) of a t-butyllithium pentane solution were continuously added and reacted to prepare a reaction product of a deep yellow slurry. Then, after stirring at −10° C. for about 2 hours, solvents were removed, and under an argon atmosphere, washing was carried out with hexane about three times to prepare 14.9 g (yield 99% or more) of a compound represented by Formula 2aa-1 below in a yellow solid state. 20 mg of the compound thus prepared represented by Formula 2aa-1 was injected into a mixture solvent of HCl aqueous solution/hexane (1 ml/1 ml), deprotection reaction was performed, and NMR was measured to confirm the preparation thereof.

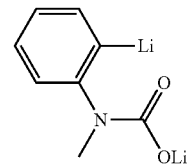

[Formula 2aa-1]

$^1$H NMR (500 MHz, Pyridine): δ 7.51 (m, 1H), 7.19 (m, 1H), 6.99 (m, 1H), 3.33 (s, 3H).

(2) Preparation of Compound Represented by Formula 2aa-2

Next, to an autoclave reactor which is a closed system capable of performing reaction under high temperature/high pressure, 1.49 g (9.15 mmol) of the compound represented by Formula 2aa-1 was put, and under a cyclohexane solvent, 1.56 g (22.87 mmol) of isoprene and 2.11 g (11.43 mmol) of ditetrahydrofurylpropane (DTHFP) were injected, followed by performing the reaction under 8 bar at 100° C. for hours. After finishing the reaction, solvents were removed by vacuum concentration, and filtering with hexane was performed to remove unreacted compound represented by Formula 2aa-1 and obtain a compound represented by Formula 2aa-2 below dissolved in the filtrate. 20 mg of the compound represented by Formula 2aa-2 was injected into a mixture solvent of HCl aqueous solution/hexane (1 ml/1 ml), deprotection reaction was performed, and NMR was measured to confirm the preparation of the compound represented by Formula 2aa-2.

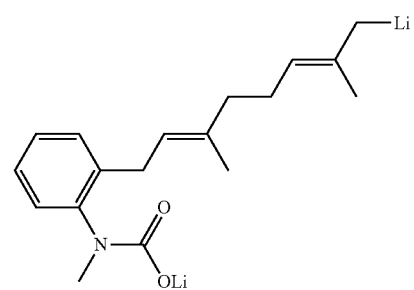

[Formula 2aa-2]

$^1$H NMR (500 MHz, CDCl$_3$): δ 7.07-7.01 (m, 2H), 6.65-6.63 (m, 2H), 5.75 (m, 1H), 5.20 (m, 1H), 4.0 (s, 1H), 3.21 (d, 2H), 3.09 (s, 1H), 2.00 (m, 4H), 1.82 (s, 6H), 1.70 (s, 3H).

Preparation Example 2

Two vacuum-dried, 2 L, stainless steel pressure vessels were prepared. To the first pressure vessel, 516 g of cyclohexane, 217.6 g of a compound represented by Formula 2bd below, and 108 g of tetramethylethylenediamine were injected to prepare a first reaction solution. At the same time, to the second pressure vessel, 258 g of 2.5 M n-butyllithium and 472 g of cyclohexane were injected to prepare a second reaction solution. In this case, the molar ratio of the compound represented by Formula 2bd, n-butyllithium and tetramethylethylenediamine was 1:1:1. The pressure of each pressure vessel was maintained to 4 bar, and by using a mass flow meter, the first reaction solution was injected via a first continuous type channel in an injection rate of 1.0 g/min, and the second reaction solution was injected via a second continuous type channel in an injection rate of 1.0 g/min, respectively, into a continuous type reactor. In this case, the temperature of the continuous type reactor was maintained to 25° C., the internal pressure was maintained to 2 bar using a backpressure regulator, and the retention time in the reactor was controlled to within 10 minutes to prepare a modification initiator. After finishing the reaction, by analyzing through gas chromatography, the preparation of a modification initiator was confirmed by confirming the conversion of the compound represented by Formula 2bd by 99% or more.

[Formula 2bd]

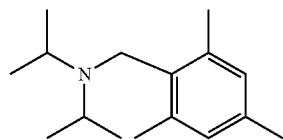

Preparation Example 3

Two vacuum-dried, 2 L, stainless steel pressure vessels were prepared. To the first pressure vessel, 6,922 g of cyclohexane, 120 g of a compound represented by Formula 2ca below, and 60 g of tetramethylethylenediamine were injected to prepare a first reaction solution. At the same time, to the second pressure vessel, 180 g of 2.0 M n-butyllithium and 6,926 g of cyclohexane were injected to prepare a second reaction solution. In this case, the molar ratio of the compound represented by Formula 2ca, n-butyllithium and tetramethylethylenediamine was 1:1:1. The pressure of each pressure vessel was maintained to 7 bar, and by using a mass flow meter, the first reaction solution was injected via a first continuous type channel in an injection rate of 1.0 g/min, and the second reaction solution was injected via a second continuous type channel in an injection rate of 1.0 g/min, respectively, into a continuous type reactor. In this case, the temperature of the continuous type reactor was maintained to –10° C., the internal pressure was maintained to 3 bar using a backpressure regulator, and the retention time in the reactor was controlled to within 10 minutes to prepare a modification initiator. After finishing the reaction, by analyzing through gas chromatography, the preparation of a modification initiator was confirmed by confirming the conversion of the compound represented by Formula 2ca by 99% or more.

[Formula 2ca]

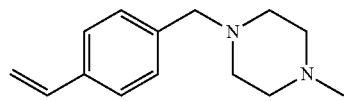

Preparation Example 4

Two vacuum-dried, 2 L, stainless steel pressure vessels were prepared. To the first pressure vessel, 516 g of cyclohexane, 100 g of a compound represented by Formula 2db below, and 105 g of tetramethylethylenediamine were injected to prepare a first reaction solution. At the same time, to the second pressure vessel, 248 g of 2.5 M n-butyllithium and 472 g of cyclohexane were injected to prepare a second reaction solution. In this case, the molar ratio of the compound represented by Formula 2db, n-butyllithium and tetramethylethylenediamine was 1:1:1. The pressure of each pressure vessel was maintained to 4 bar, and by using a mass flow meter, the first reaction solution was injected via a first continuous type channel in an injection rate of 1.0 g/min, and the second reaction solution was injected via a second continuous type channel in an injection rate of 1.0 g/min, respectively, into a continuous type reactor. In this case, the temperature of the continuous type reactor was maintained to 0° C., the internal pressure was maintained to 2 bar using a backpressure regulator, and the retention time in the reactor was controlled to within 10 minutes to prepare a modification initiator. After finishing the reaction, by analyzing through gas chromatography, the preparation of a modification initiator was confirmed by confirming the conversion of the compound represented by Formula 2db by 99% or more.

[Formula 2db]

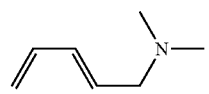

Preparation Example 5

Two vacuum-dried, 2 L, stainless steel pressure vessels were prepared. To the first pressure vessel, 6,922 g of cyclohexane, 52.2 g of a compound represented by Formula 2ea below, and 60 g of tetramethylethylenediamine were injected to prepare a first reaction solution. At the same time, to the second pressure vessel, 180 g of 2.0 M n-butyllithium and 6,926 g of cyclohexane were injected to prepare a second reaction solution. In this case, the molar ratio of the compound represented by Formula 2ea, n-butyllithium and tetramethylethylenediamine was 1:1:1. The pressure of each pressure vessel was maintained to 7 bar, and by using a mass flow meter, the first reaction solution was injected via a first continuous type channel in an injection rate of 1.0 g/min, and the second reaction solution was injected via a second continuous type channel in an injection rate of 1.0 g/min, respectively, into a continuous type reactor. In this case, the temperature of the continuous type reactor was maintained to –10° C., the internal pressure was maintained to 3 bar using a backpressure regulator, and the retention time in the reactor was controlled to within 10 minutes to prepare a modification initiator. After finishing the reaction, by analyzing through gas chromatography, the preparation of a modification initiator was confirmed by confirming the conversion of the compound represented by Formula 2bd by 99% or more.

[Formula 2ea]

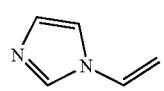

Preparation Example 6

To a flask, 60 g of cyclohexane, 2.04 g (0.02 mol) of N,N'-dimethylpropan-1,3-diamine and 6.93 g (0.044 mol) of 1-bromo-3-chloropropane were put and reacted by stirring at 60° C. for 4 hours. 1.39 g (0.2 mol) of Li was added thereto and stirred at 40° C. for 12 hours, and unreacted material was removed. 2.72 g (0.04 mol) of isoprene was added and stirred at 40° C. for 1 hour to prepare a compound represented by Formula 2fa below. Active Li concentration of the compound thus prepared was measured through a titration method using diphenylacetic acid, and the active Li concentration thus measured was 0.55 M (a degree of 83% in contrast to calculated active Li concentration (0.66 M)).

[Formula 2fa]

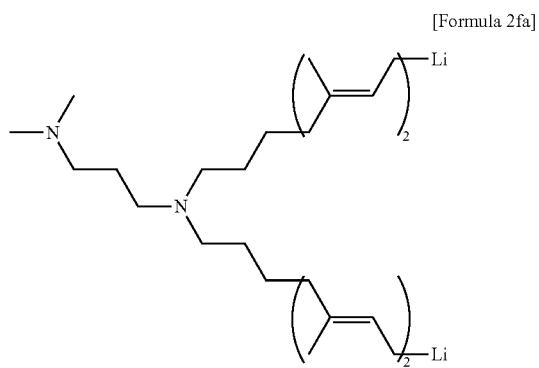

Example 1

To a first reactor among continuous reactors of three reactors connected in series, injected were a styrene solution in which 60 wt % of styrene was dissolved in n-hexane in a rate of 1.92 kg/h, a 1,3-butadiene solution in which 60 wt % of 1,3-butadiene was dissolved in n-hexane in a rate of 11.80 kg/h, n-hexane in a rate of 47.73 kg/h, a 1,2-butadiene solution in which 2.0 wt % of 1,2-butadiene was dissolved in n-hexane in a rate of 40 g/h, a solution in which 10 wt % of 2,2-(di(2-tetrahydrofuryl)propane was dissolved in n-hexane as a polar additive in a rate of 53 g/h, and a solution in which 10 wt % of the compound represented by Formula 2aa-2 prepared in Preparation Example 1 was dissolved in n-hexane as a modification initiator in a rate of 185.0 g/h. In this case, the temperature of the first reactor was maintained to 50° C., and when a polymerization conversion ratio reached 39%, a polymerization reactant was transported from the first reactor to a second reactor via a transport pipe.

Then, to the second reactor, a 1,3-butadiene solution in which 60 wt % of 1,3-butadiene was dissolved in n-hexane was injected in a rate of 2.95 kg/h. In this case, the temperature of the second reactor was maintained to 65° C., and when a polymerization conversion ratio reached 95% or more, a polymerization reactant was transported from the second reactor to a third reactor via a transport pipe.

The polymerization reactant was transported from the second reactor to the third reactor, and a solution in which wt % of a compound represented by Formula 1a below was dissolved as a modifier was continuously injected to a third reactor (molar ratio of [modifier]:[act. Li]=1:1). The temperature of the third reactor was maintained to 70° C.

After that, to a polymerization solution discharged from the third reactor, an IR1520 (BASF Co.) solution in which 30 wt % of an antioxidant was dissolved, was injected in a rate of 167 g/h and stirred. The polymer thus obtained was injected into hot water heated with steam and stirred to remove solvents to prepare a both terminal-modified conjugated diene-based polymer.

[Formula 1a]

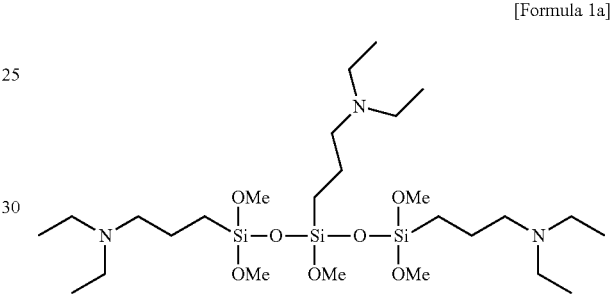

Example 2

A both terminal-modified conjugated diene-based polymer was prepared by performing the same method as in Example 1 except for transporting a polymerization reactant from the first reactor to the second reactor via a transport pipe when a polymerization conversion ratio reached 41%, and continuously supplying a solution in which 20 wt % of a compound represented by Formula 1b below was dissolved as a modifier, to the third reactor (molar ratio of [modifier]:[act. Li]=1:1), in Example 1.

[Formula 1b]

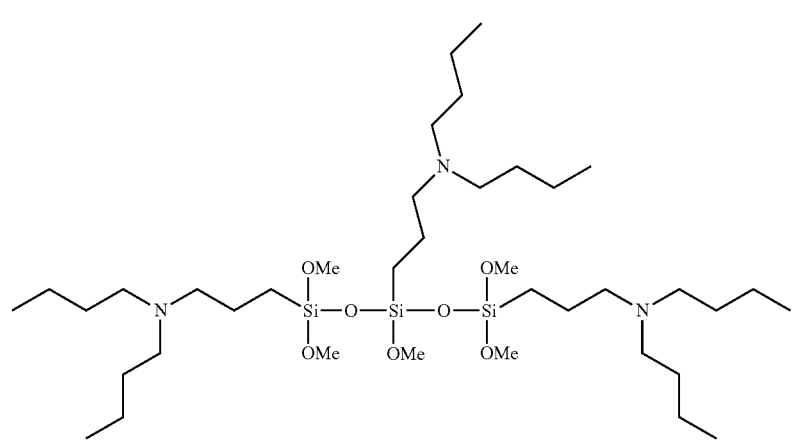

Example 3

A both terminal-modified conjugated diene-based polymer was prepared by performing the same method as in Example 1 except for transporting a polymerization reactant from the first reactor to the second reactor via a transport pipe when a polymerization conversion ratio reached 40%, and continuously supplying a solution in which 20 wt % of a compound represented by Formula 1c below was dissolved as a modifier, to the third reactor (molar ratio of [modifier]:[act. Li]=1:1), in Example 1.

[Formula 1c]

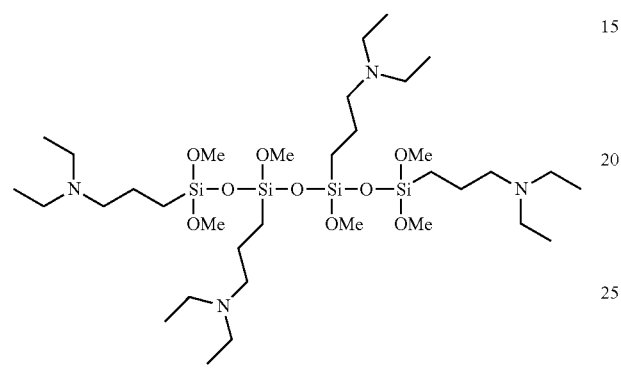

Example 4

A both terminal-modified conjugated diene-based polymer was prepared by performing the same method as in Example 1 except for transporting a polymerization reactant from the first reactor to the second reactor via a transport pipe when a polymerization conversion ratio reached 40%, and continuously supplying a solution in which 20 wt % of a compound represented by Formula 1d below was dissolved as a modifier, to the third reactor (molar ratio of [modifier]:[act. Li]=1:1), in Example 1.

[Formula 1d]

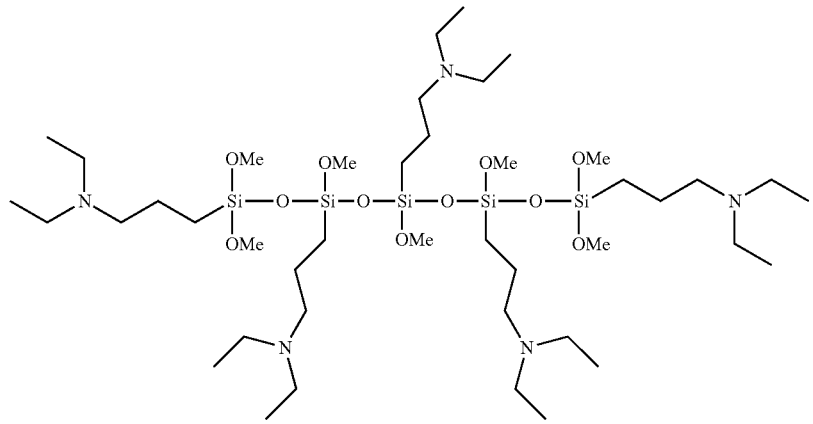

Example 5

A both terminal-modified conjugated diene-based polymer was prepared by performing the same method as in Example 1 except for injecting a solution in which 10 wt % of the modification initiator prepared in Preparation Example 2 was dissolved in n-hexane as a modification initiator, in a rate of 165 g/h.

Example 6

A both terminal-modified conjugated diene-based polymer was prepared by performing the same method as in Example 1 except for injecting a solution in which 10 wt % of the modification initiator prepared in Preparation Example 3 was dissolved in n-hexane as a modification initiator, in a rate of 185 g/h.

Example 7

To a first reactor among continuous reactors of three reactors connected in series, injected were a styrene solution in which 60 wt % of styrene was dissolved in n-hexane in a rate of 3.58 kg/h, a 1,3-butadiene solution in which 60 wt % of 1,3-butadiene was dissolved in n-hexane in a rate of 10.47 kg/h, n-hexane in a rate of 47.59 kg/h, a 1,2-butadiene solution in which 2.0 wt % of 1,2-butadiene was dissolved in n-hexane in a rate of 40 g/h, a solution in which 10 wt % of 2,2-(di(2-tetrahydrofuryl)propane was dissolved in n-hexane as a polar additive in a rate of 127 g/h, and a solution in which 10 wt % of the modification initiator prepared in Preparation Example 4 was dissolved in n-hexane as a modification initiator in a rate of 130 g/h. In this case, the temperature of the first reactor was maintained to 50° C., and when a polymerization conversion ratio reached 41%, a polymerization reactant was transported from the first reactor to a second reactor via a transport pipe.

Then, to the second reactor, a 1,3-butadiene solution in which 60 wt % of 1,3-butadiene was dissolved in n-hexane was injected in a rate of 2.62 kg/h. In this case, the temperature of the second reactor was maintained to 65° C., and when a polymerization conversion ratio reached 95% or more, a polymerization reactant was transported from the second reactor to a third reactor via a transport pipe.

The polymerization reactant was transported from the second reactor to the third reactor, and a solution in which 20 wt % of the compound represented by Formula 1a below was dissolved as a modifier, was continuously injected to a third reactor (molar ratio of [modifier]:[act. Li]=1:1). The temperature of the third reactor was maintained to 70° C.

After that, to a polymerization solution discharged from the third reactor, an IR1520 (BASF Co.) solution in which 30 wt % of an antioxidant was dissolved, was injected in a rate of 167 g/h and stirred. The polymer thus obtained was injected into hot water heated with steam and stirred to remove solvents to prepare a both terminal-modified conjugated diene-based polymer.

[Formula 1a]

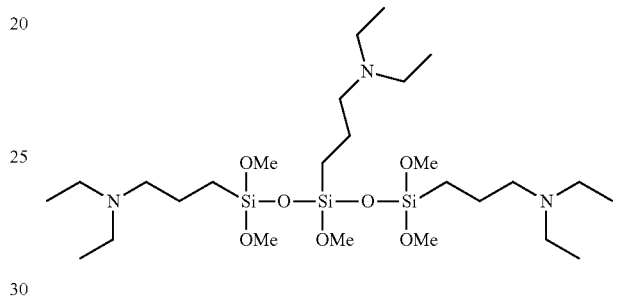

Example 8

A both terminal-modified conjugated diene-based polymer was prepared by performing the same method as in Example 7 except for transporting a polymerization reactant from the first reactor to the second reactor via a transport pipe when a polymerization conversion ratio reached 43%, and continuously supplying a solution in which 20 wt % of a compound represented by Formula 1b below was dissolved in n-hexane as a modifier, to the third reactor (molar ratio of [modifier]:[act. Li]=1:1), in Example 7.

[Formula 1b]

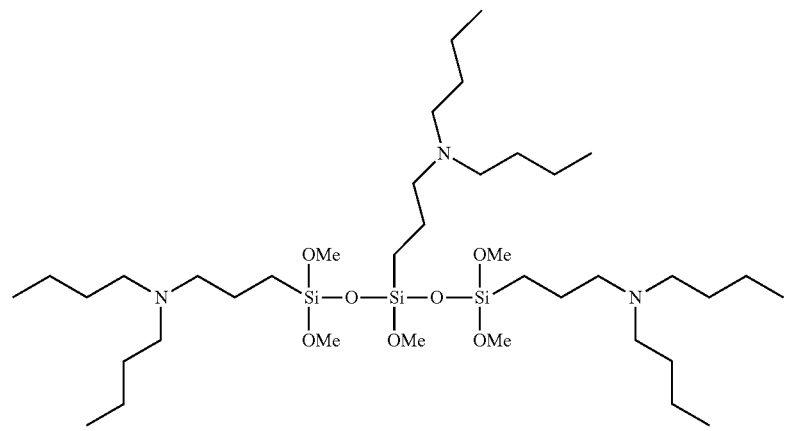

Example 9

A both terminal-modified conjugated diene-based polymer was prepared by performing the same method as in Example 7 except for continuously supplying a solution in which 20 wt % of a compound represented by Formula 1c below was dissolved in n-hexane as a modifier, to the third reactor (molar ratio of [modifier]:[act. Li]=1:1), in Example 7.

[Formula 1c]

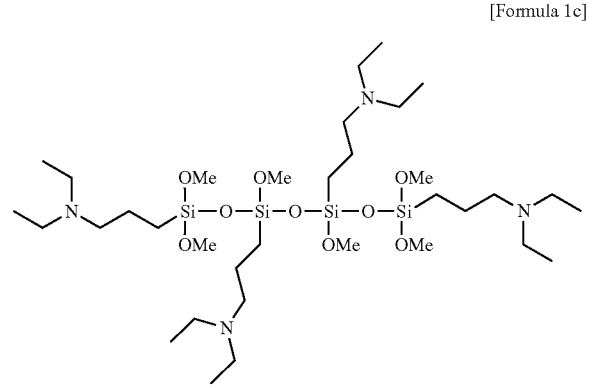 [SMILES: CCN(CC)CCC[Si](OC)(OC)O[Si](CCCN(CC)CC)(OC)O[Si](CCCN(CC)CC)(OC)O[Si](CCCN(CC)CC)(OC)OC]

Example 10

A both terminal-modified conjugated diene-based polymer was prepared by performing the same method as in Example 7 except for continuously supplying a solution in which 20 wt % of a compound represented by Formula 1e below was dissolved in n-hexane as a modifier, to the third reactor (molar ratio of [modifier]:[act. Li]=1:1), in Example 7.

[Formula 1e]

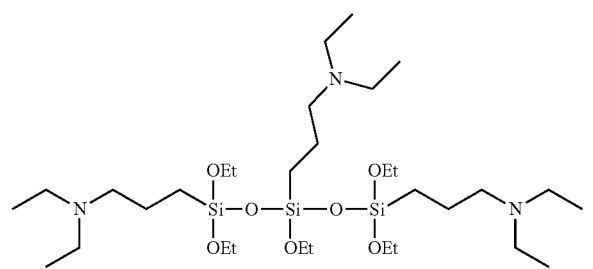

Example 11

A both terminal-modified conjugated diene-based polymer was prepared by performing the same method as in Example 7 except for injecting a solution in which 10 wt % of the modification initiator prepared in Preparation Example 5 was dissolved in n-hexane as a modification initiator, in a rate of 121 g/h.

Example 12

A both terminal-modified conjugated diene-based polymer was prepared by performing the same method as in Example 1 except for injecting a solution in which 10 wt % of the compound represented by Formula 2fa prepared in Preparation Example 6 was dissolved in n-hexane as a modification initiator in a rate of 265.0 g/h, and transporting a polymerization reactant from the first reactor to the second reactor via a transport pipe when a polymerization conversion ratio reached 41%, in Example 1.

Comparative Example 1

To a 20 L autoclave reactor, 100 g of styrene, 880 g of 1,3-butadiene, 5000 g of n-hexane and 0.89 g of 2,2-di(2-tetrahydrofuryl)propane as a polar additive were injected, and the internal temperature of the reactor was elevated to 50° C. When the internal temperature of the reactor reached 50° C., 5.5 mmol of the compound represented by Formula 2aa-2 prepared in Preparation Example 1 was injected as a modification initiator and an adiabatic reaction with heating was performed. After about 20 minutes lapse, 20 g of 1,3-butadiene was injected for capping the terminals of a polymer chain with butadiene. After 5 minutes, 5.5 mmol of the compound represented by Formula 1a was injected as a modifier and reacted for 15 minutes. Then, the polymerization reaction was quenched using ethanol, and 45 ml of a solution in which 0.3 wt % of IR1520 (BASF Co.) antioxidant was dissolved in n-hexane was added thereto. The polymer thus obtained was injected into hot water heated using steam and stirred to remove solvents to prepare a both terminal-modified conjugated diene-based polymer.

Comparative Example 2

A single terminal-modified conjugated diene-based polymer was prepared by performing the same method as in Example 4 except for injecting a n-butyllithium solution in which 10 wt % of n-butyllithium was dissolved in n-hexane instead of the modification initiator in a rate of 75.0 g/h, maintaining the temperature of the first reactor to 55° C., and transporting a polymerization reactant from the first reactor to the second reactor via a transport pipe when a polymerization conversion ratio reached 45%, in Example 4.

Comparative Example 3

A both terminal-modified conjugated diene-based polymer was prepared by performing the same method as in Example 1 except for maintaining the temperature of the first reactor to 75° C., the second reactor to 80° C., and the third reactor to 80° C., and transporting a polymerization reactant from the first reactor to the second reactor via a transport pipe when a polymerization conversion ratio reached 68%, in Example 1.

Comparative Example 4

A single terminal-modified conjugated diene-based polymer was prepared by performing the same method as in Example 1 except for transporting a polymerization reactant from the first reactor to the second reactor via a transport pipe when a polymerization conversion ratio reached 42%, and performing the reaction without injecting a modifier to the third reactor, in Example 1.

Comparative Example 5

A single terminal-modified conjugated diene-based polymer was prepared by performing the same method as in Example 1 except for continuously injecting a n-butyllithium solution in which 10 wt % of n-butyllithium was dissolved in n-hexane instead of the compound of Preparation Example 1 as the modification initiator in a rate of 75.0 g/h to the first reactor, and transporting a polymerization reactant from the first reactor to the second reactor via a transport pipe when a polymerization conversion ratio reached 41%, in Example 1.

Comparative Example 6

A single terminal-modified conjugated diene-based polymer was prepared by performing the same method as in Example 9 except for continuously injecting a n-butyllithium solution in which 10 wt % of n-butyllithium was dissolved in n-hexane instead of the compound prepared in Preparation Example 3 as the modification initiator to the first reactor in a rate of 75.0 g/h, maintaining the temperature of the first reactor to 55° C., transporting a polymerization reactant from the first reactor to the second reactor via a transport pipe when a polymerization conversion ratio reached 49%, and continuously injecting a solution in which 20 wt % of the compound represented by Formula 1d was dissolved in n-hexane as a modifier to the third reactor (molar ratio of [modifier]:[act. Li]=1:1), in Example 9.

Comparative Example 7

A both terminal-modified conjugated diene-based polymer was prepared by performing the same method as in Example 5 except for transporting a polymerization reactant from the first reactor to the second reactor via a transport pipe when a polymerization conversion ratio reached 41%, and continuously injecting a solution in which 20 wt % of a compound represented by Formula i below was dissolved in n-hexane as a modifier to the third reactor (molar ratio of [modifier]:[act. Li]=1:1), in Example 5.

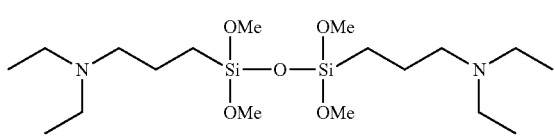

[Formula i]

In Formula i, Me is a methyl group.

Comparative Example 8

A both terminal-modified conjugated diene-based polymer was prepared by performing the same method as in Example 6 except for transporting a polymerization reactant from the first reactor to the second reactor via a transport pipe when a polymerization conversion ratio reached 41%, and continuously supplying a solution in which 20 wt % of a compound represented by Formula ii below was dissolved in n-hexane as a modifier to the third reactor (molar ratio of [modifier]:[act. Li]=1:1), in Example 6.

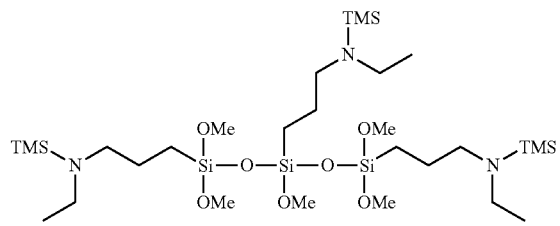

[Formula ii]

In Formula ii, TMS is a trimethylsilyl group, and Me is a methyl group.

Comparative Example 9

A both terminal-modified conjugated diene-based polymer was prepared by performing the same method as in Example 5 except for transporting a polymerization reactant from the first reactor to the second reactor via a transport pipe when a polymerization conversion ratio reached 41%, injecting a solution in which 10 wt % of the modification initiator prepared in Preparation Example 4 was dissolved in n-hexane as the modification initiator in a rate of 130 g/h, and continuously supplying a solution in which 20 wt % of a compound represented by Formula iii below was dissolved in n-hexane as a modifier to the third reactor (molar ratio of [modifier]:[act. Li]=1:1), in Example 5.

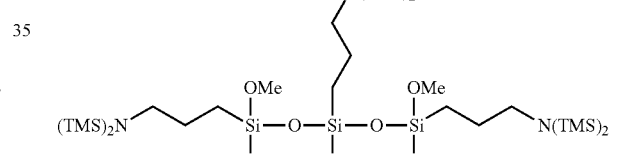

[Formula iii]

In Formula iii, TMS is a trimethylsilyl group, and Me is a methyl group.

Comparative Example 10

A both terminal-modified conjugated diene-based polymer was prepared by performing the same method as in Comparative Example 1 except for injecting 28 mmol of 3-(dimethoxy(methyl)silyl)-N,N-diethylpropan-1-amine as a modifier, in Comparative Example 1.

Comparative Example 11

A both terminal-modified conjugated diene-based polymer was prepared by performing the same method as in Comparative Example 1 except for injecting 1.6 mmol of 3-(dimethoxy(methyl)silyl)-N,N-diethylpropan-1-amine as a modifier, in Comparative Example 1.

Experimental Example 1

With respect to each of the single terminal- or both terminal-modified conjugated diene-based polymers prepared in the Examples and Comparative Examples, physical properties below were measured, and the results are shown in Table 1 and Table 2 below.

1) Styrene Unit and Vinyl Contents (Wt %)

The styrene unit (SM) and vinyl contents in each polymer were measured and analyzed using Varian VNMRS 500 MHz NMR.

When measuring NMR, 1,1,2,2-tetrachloroethane was used as a solvent, and styrene unit and vinyl contents were calculated by calculating a solvent peak as 5.97 ppm, and regarding 7.2-6.9 ppm as random styrene peaks, 6.9-6.2 ppm as block styrene peaks, 5.8-5.1 ppm as 1,4-vinyl peaks, and 5.1-4.5 ppm as 1,2-vinyl peaks. The specimen was prepared by dissolving 10 mg of a polymer in 1 mL of 1,1,2,2-tetrachloroethane.

2) Weight Average Molecular Weight (Mw, ×10$^3$ g/Mol), Number Average Molecular Weight (Mn, ×10$^3$ g/Mol), Maximum Peak Molecular Weight (Mp, ×10$^3$ g/Mol), Coupling Number (C.N) and Molecular Weight Distribution (PDI, MWD)

By gel permeation chromatography (GPC) (PL GPC220, Agilent Technologies), the weight average molecular weight (Mw), the number average molecular weight (Mn) and the maximum peak molecular weight (Mp) were measured under the conditions below and a molecular weight distribution curve was obtained. In addition, the molecular weight distribution (PDI, MWD, Mw/Mn) was calculated from each molecular weight thus measured. In this case, the molecular weight distribution curves thus obtained are shown in FIG. 1 to FIG. 4.

- column: using two of PLgel Olexis (Polymer Laboratories Co.) and one of PLgel mixed-C (Polymer Laboratories Co.) in combination
- solvent: using a mixture of tetrahydrofuran and 2 wt % of an amine compound
- flow rate: 1 ml/min
- specimen concentration: 1-2 mg/ml (diluted in THF)
- injection amount: 100 μl
- column temperature: 40° C.
- Detector: Refractive index
- Standard: Polystyrene (calibrated by cubic function)

In addition, the coupling number was obtained by collecting a partial polymer prior to injecting a modifier or a coupling agent in each of the Examples and Comparative Examples, obtaining a peak molecular weight (Mp$_1$) of a polymer, obtaining a peak molecular weight (Mp$_2$) of each modified conjugated diene-based polymer, and calculating by the following Mathematical Equation 2:

Coupling number(C.N)=Mp$_2$/Mp$_1$     [Mathematical Equation 2]

3) Mooney Viscosity and Mooney Stress Relaxation Ratio

The mooney viscosity (MV, (ML1+4, @100° C.) MU) was measured by using MV-2000 (Alpha Technologies Co.) using Large Rotor at a rotor speed of 2±0.02 rpm at 100° C. In this case, a specimen used was stood at room temperature (23±3° C.) for 30 minutes or more, and 27±3 g of the specimen was collected and put in a die cavity, and then, Platen was operated for 4 minutes for measurement.

After measuring the mooney viscosity, the slope value of the change of the mooney viscosity shown while releasing torque was measured, and the mooney stress relaxation ratio was obtained.

4) Si Content

The Si content was measured by an ICP analysis method, which used an inductively coupled plasma optical emission spectroscopy (ICP-OES; Optima 7300DV). Particularly, measurement was performed by adding about 0.7 g of a specimen to a platinum (Pt) crucible and adding about 1 mL of concentrated sulfuric acid (98 wt %, electronic grade) thereto, heating at 300° C. for 3 hours, incinerating the specimen in an electrical furnace (Thermo Scientific, Lindberg Blue M) by the following program of steps 1 to 3:

1) step 1: initial temp 0° C., rate (temp/hr) 180° C./hr, temp (holdtime) 180° C. (1 hr)
2) step 2: initial temp 180° C., rate (temp/hr) 85° C./hr, temp (holdtime) 370° C. (2 hr)
3) step 3: initial temp 370° C., rate (temp/hr) 47° C./hr, temp (holdtime) 510° C. (3 hr), adding 1 mL of concentrated nitric acid (48 wt %) and 20 μl of concentrated hydrofluoric acid (50 wt %) to a residue, sealing the platinum crucible and shaking for 30 minutes or more, adding 1 mL of boric acid to the specimen, storing at 0° C. for 2 hours or more, diluting in 30 mL of ultrapure water, and performing incineration.

5) N Content

The N content was measured through an NSX analysis method using a quantitative analyzer of a trace amount of nitrogen (NSX-2100H). Particularly, the quantitative analyzer of a trace amount of nitrogen (Auto sampler, Horizontal furnace, PMT & Nitrogen detector) was turned on, carrier gas flow amounts were set to 250 ml/min for Ar, 350 ml/min for 02, and 300 ml/min for ozonizer, a heater was set to 800° C., and the analyzer was stood for about 3 hours for stabilization. After stabilizing the analyzer, a calibration curve of calibration curve ranges of 5 ppm, 10 ppm, 50 ppm, 100 ppm and 500 ppm was made using Nitrogen standard (AccuStandard S-22750-01-5 ml), and an area corresponding to each concentration was obtained. Then, by using the ratios of concentrations to areas, a straight line was made. After that, a ceramic boat holding 20 mg of a specimen was put in the auto sampler of the analyzer and measurement was conducted to obtain an area. By using the area of the specimen thus obtained and the calibration curve, the N content was calculated.

| Division | | | Example | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 | 12 |
| Reaction conditions | Polar additive | | DTP | | | | | | | | | | | |
| | P1 | | a | a | a | a | b | c | d | d | d | d | e | f |
| | M | | A | B | C | D | A | A | A | B | C | E | A | A |
| | First reactor temperature (° C.) | | 50 | | | | | | | | | | | |
| | First reactor polymerization conversion ratio (%) | | 30 | 41 | 40 | 40 | 39 | 39 | 41 | 43 | 41 | 41 | 41 | 41 |
| NMR (wt %) | SM | | 10 | 10 | 0 | 10 | 10 | 10 | 21 | 21 | 21 | 21 | 21 | 10 |
| | Vinyl | | 36 | 36 | 38 | '38 | 38 | 36 | 50 | 50 | 50 | 50 | 50 | 3 |
| GPC | Mw( ×10$^3$ g/mol) | | 494 | 479 | 500 | 540 | 400 | 470 | 501 | 505 | 5.49 | 005 | 491 | 529 |
| | Mn( ×10$^3$ g/mol) | | 321 | 313 | 331 | 329 | 320 | 305 | 319 | 320 | 337 | 320 | 313 | 327 |
| | PDI | | 1.54 | 153 | 150 | 165 | 152 | 154 | 157 | 1.58 | 153 | 1.58 | 1.57 | 1.60 |

-continued

| Division | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| C.N. | 1.72 | 1.75 | 1.78 | 1.80 | 1.72 | 1.71 | 1.72 | 1.73 | 1.7' | 1.70 | 1.73 | 1.73 |
| Molecular weight distribution curve | Unimodal | | | | | | | | | | | |
| Mooney viscosity (MV) | 58 | 5.9 | 62 | 61 | 55 | 56 | 62 | 61 | 64 | 50 | 59 | 6C |
| Mooney stress relaxation ratio (-S/R) | 0.957 | 0.950 | 0.925 | 0.910 | 0.944 | 0.947 | 0.942 | 0.940 | 0.901 | 0.945 | 0.242 | 0.941 |
| Si content (ppm) | 270 | 279 | 85.2 | 448 | 298 | 297 | 207 | 284 | 367 | 295 | 200 | 281 |
| N content (ppm) | 21 2 | 210 | 244 | 283 | 2151 | 292 | 21?+0 | 214 | 242 | 21 9 | 286 | 275 |

| | Division | Comparative Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Reaction conditions | Polar additive | DTP | | | | | | | | | | |
| | PI | a | g | a | a | g | g | b | c | d | a | a |
| | M | A | D | A | — | A | D | F | G | H | J | J |
| | First reactor, temperature (° C.) | 50->80 | 55 | 75 | 50 | 50 | 55 | 50 | 50 | 50 | 50->80 | 50->80 |
| | First reactor polymerization conversion ratio (%) | Batch | 45 | 68 | 42 | 41 | 49 | 41 | 41 | 41 | Batch | Batch |
| NMR (wt %) | SM | 10 | 10 | 10 | 10 | 10 | 21 | 10 | 10 | 10 | 10 | 10 |
| | Vinyl | 38 | 38 | 38 | 38 | 38 | 50 | 38 | 38 | 38 | 38 | 38 |
| GPC | Mw( x$10^3$ g/mol) | 439 | 502 | 602 | 439 | 476 | 509 | 489 | 505 | 479 | 369 | 532 |
| | Mn( x$10^3$ g/mol) | 300 | 310 | 332 | 301 | 311 | 316 | 322 | 330 | 315 | 250 | 380 |
| | PDI | 1.46 | 1.62 | 1.81 | 1.46 | 1.56 | 1.61 | 1.53 | 1.55 | 1.54 | 1.21 | 1.40 |
| | C.N. | 1.87 | 1.80 | 1.59 | — | 1.70 | 1.79 | 1.64 | 1.72 | 1.73 | 1.00 | 2.00 |
| | Molecular weight distribution curve | Bimodal | | | | | Unimodal | | | | | |
| | Mooney viscosity (MV) | 55 | 59 | 65 | 55 | 58 | 62 | 58 | 61 | 58 | 47 | 60 |
| | Mooney stress relaxation ratio (-S/R) | 0.990 | 0.907 | 0.60E. | 1.210 | 0.953 | 0.914 | 0.960 | 0.940 | 0.941 | 1.130 | 0.990 |
| | Si content (ppm) | 278 | 438 | 207 | — | 277 | 364 | 205 | 297 | 296 | 230 | 108 |
| | N content (ppm) | 220 | 208 | 165 | 75 | 143 | 185 | 174 | 291 | 273 | 195 | 115 |

In Table 1 and Table 2, PI means an initiator, M means a modifier or a coupling agent, and particular materials of the initiator, modifier and coupling agent are shown in Table 3 below.

TABLE 3

| Initiator | a | Compound represented by Formula 2aa-2 |
|---|---|---|
| | b | Compound represented by Formula 2bd |
| | c | Compound represented by Formula 2ca |
| | d | Compound represented by Formula 2db |
| | e | Compound represented by Formula 2ea |
| | f | Compound represented by Formula 2fa |
| | g | n-butyllithium |
| Modifier or coupling agent | A | Compound represented by Formula 1a |
| | B | Compound represented by Formula 1b |
| | C | Compound represented by Formula 1c |
| | D | Compound represented by Formula 1d |
| | E | Compound represented by Formula 1e |
| | F | Compound of Formula i |
| | G | Compound of Formula ii |
| | H | Compound of Formula iii |
| | J | 3-(dimethoxy(methyl)silyl)-N,N-diethylpropan-1-amine |

Referring to Tables 1 and 2, it could be confirmed that the modified conjugated diene-based polymers of Examples to 12 prepared according to embodiments of the present invention satisfied all ranges of physical properties required. Particularly, a molecular weight distribution curve had a unimodal shape and at the same time, a PDI value was less than 1.7, and it could be expected that processability might be significantly excellent and compounding properties might be excellent. All mooney stress relaxation ratios were 0.7 or more, preferably, 0.8 or more, and it could be expected that linearity might be excellent.

In contrast, it could be confirmed that Comparative Example 3 in which the polymerization conversion ratio when transporting from the first reactor to the second reactor was not controlled, showed a high PDI value and a mooney stress relaxation ratio of a specific value or less, and balance of physical properties or linearity showed unsatisfactory results.

Also, a common modified conjugated diene-based polymer obtained by applying batch polymerization as in Comparative Example 1 had a PDI value of less than 1.7 but a bimodal shape molecular weight distribution curve, and it could be expected that processability might be inferior. Among the results of batch polymerization, as in Comparative Examples 10 and 11, a unimodal shape molecular weight distribution curve could be shown, but this corresponded to an extreme case having the minimum value or the maximum value of the coupling number, and such modified conjugated diene-based polymer by the batch polymerization might led the deterioration of compounding properties as found from the above-explanation or evaluation results explained later.

FIGS. 1 to 4 show the molecular weight distribution curves of Example 1, Comparative Example 1, Comparative Examples 10 and 11, and it could be confirmed that each shape of the molecular weight distribution curves is the same as described above.

Experimental Example 2

In order to comparatively analyze the physical properties of a rubber composition including each of the both terminal- or single terminal-modified conjugated diene-based copolymers prepared in the Examples and Comparative Examples, and a molded article manufactured therefrom, tensile properties and viscoelasticity properties were measured, respectively, and the results are shown in Table 5 and Table 6 below.

1) Preparation of Rubber Specimen

Compounding was performed using each of the modified conjugated diene-based polymers of the Examples and Comparative Examples as a raw material rubber under the compounding conditions shown in Table 4 below. The raw materials in Table 4 are represented by parts by weight based on 100 parts by weight of the raw material rubber.

TABLE 4

| Division | Raw material | Amount (parts by weight) |
| --- | --- | --- |
| First stage mulling | Rubber | 100 |
|  | Silica | 70 |
|  | Coupling agent (X50S) | 11.2 |
|  | Process oil | 37.5 |
|  | Zinc white | 3 |
|  | Stearic acid | 2 |
|  | Antioxidant | 2 |
|  | Antiaging agent | 2 |
|  | wax | 1 |
| Second stage mulling | Sulfur | 1.5 |
|  | Rubber accelerator | 1.75 |
|  | Vulcanization accelerator | 2 |

Particularly, the rubber specimen was mulled via a first stage mulling and a second stage mulling. In the first stage mulling, a raw material rubber, silica (filler), an organic silane coupling agent (X50S, Evonik), a process oil (TADE oil), zinc oxide (ZnO), stearic acid, an antioxidant (TMQ (RD)) (2,2,4-trimethyl-1,2-dihydroquinoline polymer), an antiaging agent (6PPD ((dimethylbutyl)-N-phenyl-phenylenediamine) and wax (Microcrystaline Wax) were mulled using a banbury mixer equipped with a temperature controlling apparatus. In this case, the initial temperature of a mulling apparatus was controlled to 70° C., and after finishing mixing, a first compound mixture was obtained at a discharge temperature of 145° C. to 155° C. In the second stage mulling, the first compound mixture was cooled to room temperature, and the first compound mixture, sulfur, a rubber accelerator (DPD (diphenylguanine)), and a vulcanization accelerator (CZ (N-cyclohexyl-2-benzothiazylsulfenamide)) were added to the mulling apparatus and mixed at a temperature of 100° C. or less to obtain a second compound mixture. Then, via a curing process at 160° C. for 20 minutes, a rubber specimen was formed.

2) Tensile Properties

The tensile properties were measured by manufacturing each specimen and measuring tensile strength when broken and tensile stress when stretched by 300% (300% modulus) of each specimen according to an ASTM 412 tensile test method. Particularly, tensile properties were measured using a Universal Test Machin 4204 tensile tester (Instron Co.) in a rate of 50 cm/min at room temperature.

3) Viscoelasticity Properties

The viscoelasticity properties were found by measuring viscoelasticity behavior on thermodynamic deformation at each measurement temperature (−60° C.–60° C.) with a frequency of 10 Hz by using a dynamic mechanical analyzer (GABO Co.) in a film tension mode and securing a tan δ value. From the resultant values, if the index value of tan δ at a low temperature of 0° C. increases, wet skid resistance becomes better, and if the index value of tan δ at a high temperature of 60° C. decreases, hysteresis loss decreases, and low rolling resistance (fuel consumption ratio) becomes better.

4) Processability Properties

By measuring the mooney viscosity (MV, (ML 1+4, @100° C.) MU) of the secondary compounded mixture obtained during 1) preparation of rubber specimen, the processability properties of each polymer were comparatively analyzed, and in this case, the lower the measured value of the moony viscosity is, the better the processability properties are.

Particularly, by using MV-2000 (Alpha Technologies Co.) using Large Rotor at a rotor speed of 2±0.02 rpm at 100° C., each secondary compounded mixture was stood at room temperature (23±3° C.) for 30 minutes or more, and 27±3 g was collected and put in a die cavity, and then, Platen was operated for 4 minutes for measurement.

| Division | | Example | | | | | | Comparative Example | | | | | | | | | |
| --- | --- | --- | --- | --- | --- | --- | --- | --- | --- | --- | --- | --- | --- | --- | --- | --- | --- |
|  |  | 1 | 2 | 3 | 4 | 5 | 6 | 12 | 1 | 2 | 3 | 4 | 5 | 7 | 8 | 9 | 10 | 11 |
| Tensile Properties (kgf/cm²) | Tensile Strength | 162 | 164 | 164 | 167 | 161 | 160 | 163 | 155 | 157 | 159 | 157 | 159 | 160 | 161 | 163 | 145 | 139 |
|  | 300% Modulus | 112 | 111 | 116 | 114 | 115 | 110 | 113 | 110 | 98 | 99 | 93 | 99 | 107 | 105 | 106 | 105 | 107 |
| Viscoelasticity properties | Tan δ( at 0° C.) | 103 | 102 | 104 | 104 | 102 | 103 | 102 | 100 | 98 | 97 | 97 | 100 | 100 | 100 | 101 | 98 | 99 |
|  | Tan δ( at 0° C.) | 110 | 113 | 110 | 111 | 110 | 112 | 109 | 106 | 102 | 101 | 95 | 100 | 100 | 111 | 113 | 98 | 95 |
| Processability properties |  | 84 | 82 | 84 | 84 | 82 | 83 | 83 | 94 | 76 | 89 | 77 | 74 | 81 | 94 | 98 | 98 | 94 |

In Table 5, the resultant values of viscoelasticity properties of Examples 1 to 6, Example 12, Comparative Examples 1 to 4, and Comparative Examples 7 to 11 were indexed (%) based on the measured value of Comparative Example 5 and shown. The higher value means better results.

Referring to Table 5, Examples 1 to 6 and 12 showed significantly excellent tensile strength and modulus, as expected through the measurement of the physical properties of the polymers in Experimental Example 1, and with respect to viscoelasticity properties, it was confirmed that tan δ value at a low temperature was somewhat increased level while tan δ value at a high temperature was markedly improved, and it could be confirmed that a fuel consumption ratio was markedly improved without loss of wet skid resistance.

Further, it was confirmed that in case where polymers prepared through batch polymerization as in Comparative Examples 10 and 11 had a molecular weight distribution curve of a unimodal shape, inferior processability intrinsic to batch polymerization was shown as it was and excellent compounding properties which could be achieved as advantages of the batch polymerization were not achieved. Meanwhile, the inferior processability intrinsic to the batch polymerization could be confirmed in Comparative Example 1 in which the same range of the coupling number as the Examples was applied.

In addition, in case of Comparative Example 3, results obtained by not applying the preparation method of the present invention were shown, and it could be found that the ranges of the PDI value and the mooney stress relaxation ratio were not satisfied, and inferior viscoelasticity in contrast to the Examples was noticed. Also, in case of Comparative Examples 2, 4, 5 and 7 to 9, in which the modifier and/or modification initiator according to the present invention were not applied, the viscoelasticity properties were inferior or processability properties were inferior, in the same manner.

TABLE 6

| Division | | Example | | | | | Comparative Example |
|---|---|---|---|---|---|---|---|
| | | 7 | 8 | 9 | 10 | 11 | 6 |
| Tensile properties (kgf/cm2) | Tensile strength | 186 | 187 | 185 | 182 | 185 | 173 |
| | 300% modulus | 130 | 129 | 131 | 132 | 128 | 119 |
| Viscoelasticity properties | tan δ (at 0° C.) | 101 | 102 | 103 | 102 | 103 | 100 |
| | tan δ (at 60° C.) | 110 | 109 | 109 | 108 | 109 | 100 |
| Processability properties | | 81 | 83 | 81 | 84 | 82 | 76 |

In Table 6, the resultant values of viscoelasticity properties of Examples 7 to 11 were indexed (%) based on the measured value of Comparative Example 6 and shown. The higher value means better results.

Table 6 shows resultant sets evaluated by changing the comonomer contents in the sets of Table 5, and it could be confirmed from Table 6 that effects were not changed though the contents of the monomers were changed, and the same results were shown as the improved results of the physical properties as confirmed in Table 5.

The invention claimed is:

1. A modified conjugated diene-based polymer having:
a unimodal shape molecular weight distribution curve by gel permeation chromatography (GPC), and
a molecular weight distribution (PDI; MWD) of 1.0 to less than 1.7,
wherein the modified conjugated diene-based polymer includes a functional group derived from a modifier represented by Formula 1 below at one terminal, and a functional group derived from a modification initiator at the other terminal:

[Formula 1]

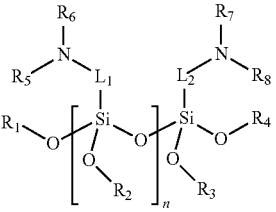

in Formula 1,
$R_1$ to $R_8$ are each independently an alkyl group of 1 to 20 carbon atoms,
$L_1$ and $L_2$ are each independently an alkylene group of 1 to 20 carbon atoms, and
n is an integer of 2 to 4.

2. The modified conjugated diene-based polymer of claim 1, wherein, in Formula 1, $R_1$ to $R_8$ are each independently an alkyl group of 1 to 10 carbon atoms.

3. The modified conjugated diene-based polymer of claim 1, wherein, in Formula 1, $R_1$ to $R_8$ are each independently an alkyl group of 1 to 6 carbon atoms.

4. The modified conjugated diene-based polymer of claim 1, wherein, in Formula 1, $R_1$ to $R_4$ are each independently methyl groups or ethyl groups, and $R_5$ to $R_8$ are each independently alkyl groups of 1 to 10 carbon atoms.

5. The modified conjugated diene-based polymer of claim 1, wherein the modifier represented by Formula 1 is one or more selected from the group consisting of the following Formula 1a to Formula 1e:

[Formula 1a]

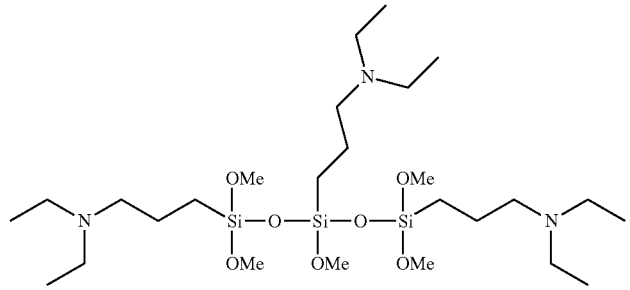

[Formula 1b]
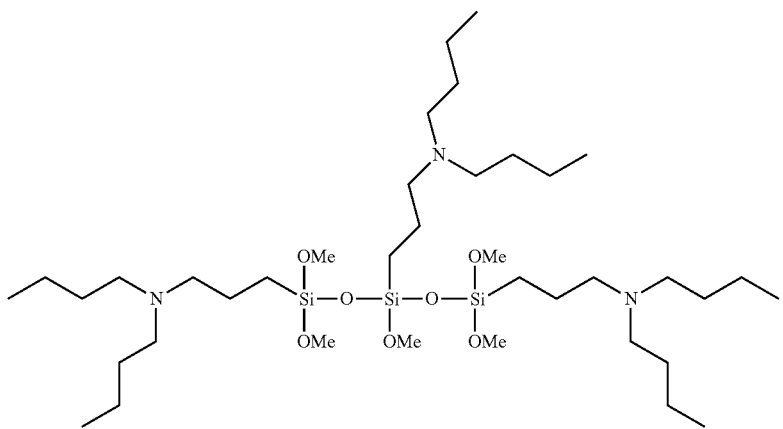
[Formula 1c]
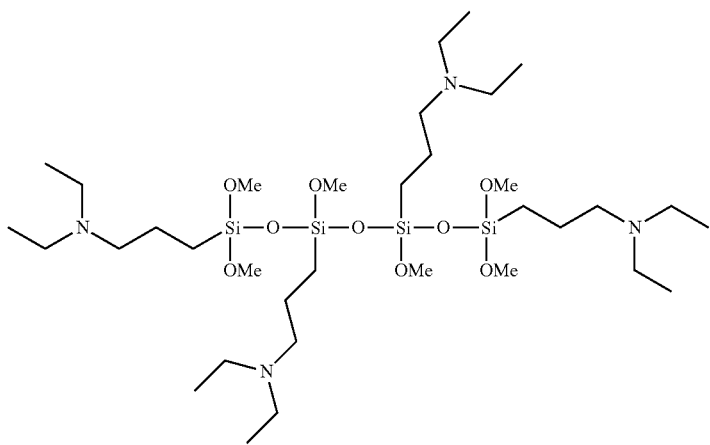
[Formula 1d]
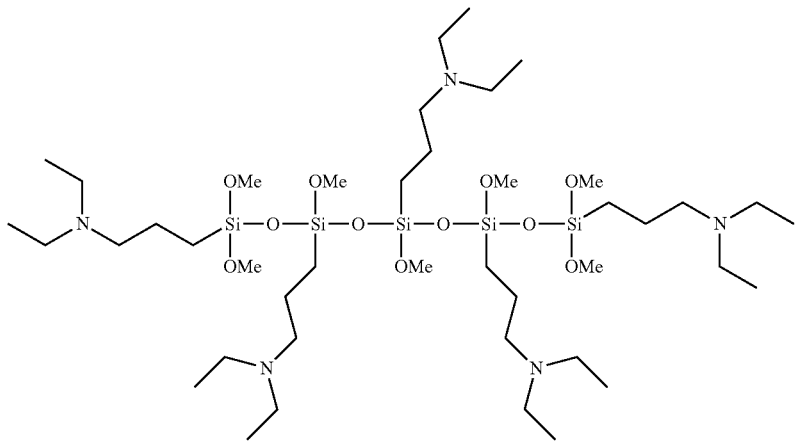
[Formula 1e]
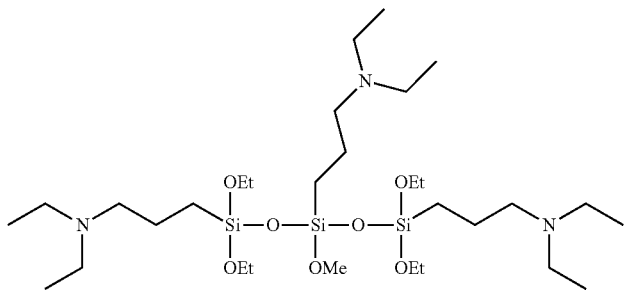

in Formula 1a to Formula 1e, Me is a methyl group, and Et is an ethyl group.

6. The modified conjugated diene-based polymer of claim 1, wherein the modification initiator is one or more compounds selected from the group consisting of:

a compound represented by the following Formula 2a;

a reaction product of a compound selected from the compounds represented by the following Formula 2b to Formula 2e with an organometallic compound; and a compound represented by the following Formula 2f:

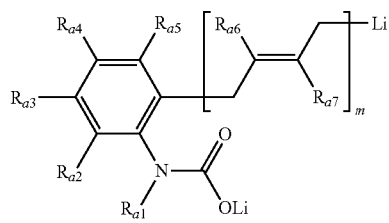

[Formula 2a]

in Formula 2a, $R_{a1}$ to $R_{a7}$ are each independently a hydrogen atom; an alkyl group of 1 to 20 carbon atoms; a cycloalkyl group of 3 to 20 carbon atoms; an aryl group of 6 to 20 carbon atoms; an arylalkyl group of 7 to 20 carbon atoms; an alkylaryl group of 7 to 20 carbon atoms; an alkoxy group of 1 to 20 carbon atoms; an alkoxyalkyl group of 2 to 20 carbon atoms; an aryloxy group of 6 to 20 carbon atoms; an aryloxyalkyl group of 7 to 20 carbon atoms; or a heteroatom-containing alkyl group of 1 to 20 carbon atoms, and m is an integer of 0 to 3,

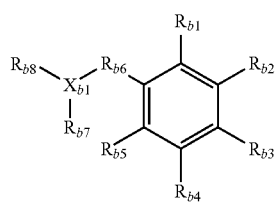

[Formula 2b]

in Formula 2b, $X_{b1}$ is N or O, in case where $X_{b1}$ is O, $R_{b7}$ or $R_{b8}$ is not present, $R_{b1}$ to $R_{b5}$ are each independently a hydrogen atom; an alkyl group of 1 to 20 carbon atoms; a cycloalkyl group of 3 to 20 carbon atoms; an aryl group of 6 to 20 carbon atoms; an arylalkyl group of 7 to 20 carbon atoms; or an alkylaryl group of 7 to 20 carbon atoms; or adjacent two of $R_{b1}$ to $R_{b5}$ are connected, and together with the carbon atoms to which they are attached to form an aliphatic or aromatic ring, $R_{b6}$ is a single bond; or an alkylene group of 1 to 12 carbon atoms, and $R_{b7}$ and $R_{b8}$ are each independently an alkyl group of 1 to 14 carbon atoms or an aryl group of 6 to 14 carbon atoms,

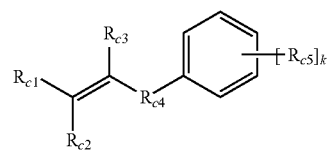

[Formula 2c]

in Formula 2c, $R_{c1}$ to $R_{c3}$ are each independently a hydrogen atom; an alkyl group of 1 to 30 carbon atoms;

an alkenyl group of 2 to 30 carbon atoms; an alkynyl group of 2 to 30 carbon atoms; a heteroalkyl group of 1 to 30 carbon atoms, a heteroalkenyl group of 2 to 30 carbon atoms; a heteroalkynyl group of 2 to 30 carbon atoms; a cycloalkyl group of 5 to 30 carbon atoms; an aryl group of 6 to 30 carbon atoms; or a heterocyclic group of 3 to 30 carbon atoms, $R_{c4}$ is a single bond, or an alkylene group of 1 to 20 carbon atoms; a cycloalkylene group of 5 to 20 carbon atoms; or an arylene group of 6 to 20 carbon atoms, each of which is unsubstituted or substituted with an alkyl group of 1 to 10 carbon atoms, a cycloalkyl group of 5 to 10 carbon atoms, or an aryl group of 6 to 20 carbon atoms, k is an integer of 1 to 5, when k is an integer of 2 to 5, each of multiple $R_{c5}$ are the same or different, and $R_{c5}$ is each independently an alkyl group of 1 to 30 carbon atoms; an alkenyl group of 2 to 30 carbon atoms; an alkynyl group of 2 to 30 carbon atoms; a heteroalkyl group of 1 to 30 carbon atoms; a heteroalkenyl group of 2 to 30 carbon atoms; a heteroalkynyl group of 2 to 30 carbon atoms; a cycloalkyl group of 5 to 30 carbon atoms; an aryl group of 6 to 30 carbon atoms; a heterocyclic group of 3 to 30 carbon atoms; or a functional group represented by the following Formula 2c-1 or Formula 2c-2, and at least one $R_{c5}$ is a functional group represented by Formula 2c-1 or Formula 2c-2,

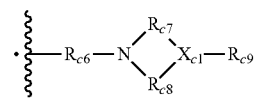

[Formula 2c-1]

in Formula 2c-1, $R_{c6}$ is an alkylene group of 1 to 20 carbon atoms; a cycloalkylene group of 5 to 20 carbon atoms; or an arylene group of 6 to 20 carbon atoms, each of which is unsubstituted or substituted with an alkyl group of 1 to 10 carbon atoms, a cycloalkyl group of 5 to 10 carbon atoms, or an aryl group of 6 to 20 carbon atoms, $R_{c7}$ and $R_{c8}$ are each independently an alkylene group of 1 to 20 carbon atoms, which is unsubstituted, or substituted with an alkyl group of 1 to 10 carbon atoms, a cycloalkyl group of 5 to 10 carbon atoms, or an aryl group of 6 to 20 carbon atoms, $R_{c9}$ is a hydrogen atom; an alkyl group of 1 to 30 carbon atoms; an alkenyl group of 2 to 30 carbon atoms; an alkynyl group of 2 to 30 carbon atoms; a heteroalkyl group of 1 to 30 carbon atoms; a heteroalkenyl group of 2 to 30 carbon atoms; a heteroalkynyl group of 2 to 30 carbon atoms; a cycloalkyl group of 5 to 30 carbon atoms; an aryl group of 6 to 30 carbon atoms; or a heterocyclic group of 3 to 30 carbon atoms, and $X_{c1}$ is N, O or S atom, in case where $X_{c1}$ is O or S, $R_{c9}$ is not present,

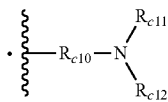

[Formula 2c-2]

in Formula 2c-2, $R_{c10}$ is an alkylene group of 1 to 20 carbon atoms; a cycloalkylene group of 5 to 20 carbon atoms; or an arylene group of 6 to 20 carbon atoms, each of which is unsubstituted or substituted with an alkyl group of 1 to 10 carbon atoms, a cycloalkyl group of 5 to 10 carbon atoms, or an aryl group of 6 to 20 carbon atoms, and $R_{c11}$ and $R_{c12}$ are each independently an alkyl group of 1 to 30 carbon atoms; an alkenyl group of 2 to 30 carbon atoms; an alkynyl group of 2 to 30 carbon atoms; a heteroalkyl group of 1 to 30 carbon atoms; a heteroalkenyl group of 2 to 30 carbon atoms; a heteroalkynyl group of 2 to 30 carbon atoms; a cycloalkyl group of 5 to 30 carbon atoms; an aryl group of 6 to 30 carbon atoms; or a heterocyclic group of 3 to 30 carbon atoms,

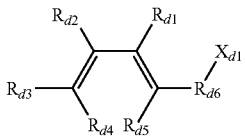

[Formula 2d]

in Formula 2d, $R_{d1}$ to $R_{d5}$ are each independently a hydrogen atom; an alkyl group of 1 to 30 carbon atoms; an alkenyl group of 2 to 30 carbon atoms; an alkynyl group of 2 to 30 carbon atoms; a heteroalkyl group of 1 to 30 carbon atoms; a heteroalkenyl group of 2 to 30 carbon atoms; a heteroalkynyl group of 2 to 30 carbon atoms; a cycloalkyl group of 5 to 30 carbon atoms; an aryl group of 6 to 30 carbon atoms; or a heterocyclic group of 3 to 30 carbon atoms, $R_{d6}$ is an alkylene group of 1 to 20 carbon atoms, which is unsubstituted, or substituted with an alkyl group of 1 to 30 carbon atoms; an alkenyl group of 2 to 30 carbon atoms; an alkynyl group of 2 to 30 carbon atoms; a heteroalkyl group of 1 to 30 carbon atoms, a heteroalkenyl group of 2 to 30 carbon atoms; a heteroalkynyl group of 2 to 30 carbon atoms; a cycloalkyl group of 5 to 30 carbon atoms; an aryl group of 6 to 30 carbon atoms; or a heterocyclic group of 3 to 30 carbon atoms, and $X_{d1}$ is a functional group represented by the following Formula 2d-1 or Formula 2d-2,

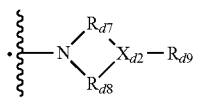

[Formula 2d-1]

in Formula 2d-1, $R_{d7}$ and $R_{d8}$ are each independently an alkylene group of 1 to 20 carbon atoms, which is unsubstituted, or substituted with an alkyl group of 1 to 10 carbon atoms, a cycloalkyl group of 5 to 10 carbon atoms, or an aryl group of 6 to 20 carbon atoms, $R_{d9}$ is a hydrogen atom; an alkyl group of 1 to 30 carbon atoms; an alkenyl group of 2 to 30 carbon atoms; an alkynyl group of 2 to 30 carbon atoms; a heteroalkyl group of 1 to 30 carbon atoms; a heteroalkenyl group of 2 to 30 carbon atoms; a heteroalkynyl group of 2 to 30 carbon atoms; a cycloalkyl group of 5 to 30 carbon atoms; an aryl group of 6 to 30 carbon atoms; or a heterocyclic group of 3 to 30 carbon atoms, and $X_{d2}$ is N, O or S, in case where $X_{d2}$ is O or S, $R_{d9}$ is not present,

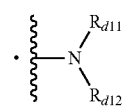

[Formula 2d-2]

in Formula 2d-2, $R_{d11}$ and $R_{d12}$ are each independently an alkyl group of 1 to 30 carbon atoms; an alkenyl group of 2 to 30 carbon atoms; an alkynyl group of 2 to 30 carbon atoms; a heteroalkyl group of 1 to 30 carbon atoms; a heteroalkenyl group of 2 to 30 carbon atoms; a heteroalkynyl group of 2 to 30 carbon atoms; a cycloalkyl group of 5 to 30 carbon atoms; an aryl group of 6 to 30 carbon atoms; or a heterocyclic group of 3 to 30 carbon atoms,

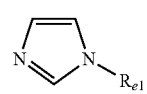

[Formula 2e]

in Formula 2e, $R_{e1}$ is an alkenyl group of 2 to 10 carbon atoms,

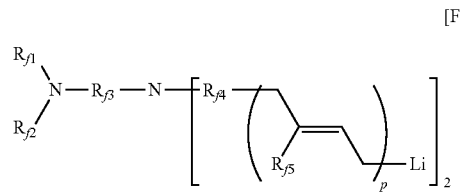

[Formula 2f]

in Formula 2f, $R_{f1}$, $R_{f2}$ and $R_{f5}$ are each independently an alkyl group of 1 to 20 carbon atoms; a cycloalkyl group of 3 to 20 carbon atoms; an aryl group of 6 to 20 carbon atoms; an arylalkyl group of 7 to 20 carbon atoms; or an alkylaryl group of 7 to 20 carbon atoms, $R_{f3}$ and $R_{f4}$ are each independently an alkylene group of 1 to 20 carbon atoms or an arylene group of 6 to 20 carbon atoms, and p is an integer of 1 to 5.

7. The modified conjugated diene-based polymer of claim 1, wherein the modified conjugated diene-based polymer has a number average molecular weight (Mn) of 1,000 g/mol to 2,000,000 g/mol, and a weight average molecular weight (Mw) of 1,000 g/mol to 3,000,000 g/mol.

8. The modified conjugated diene-based polymer of claim 1, wherein the modified conjugated diene-based polymer has a Si content and a N content of 50 ppm or more, respectively, based on a weight.

9. The modified conjugated diene-based polymer of claim 1, wherein the modified conjugated diene-based polymer has a mooney stress relaxation ratio measured at 100° C. of 0.7 to 3.0.

10. The modified conjugated diene-based polymer of claim 1, wherein a coupling number (C.N.) of the modified conjugated diene-based polymer satisfies 1<C.N<F, where F is the number of functional groups of the modifier.

11. The modified conjugated diene-based polymer of claim 1, wherein, in Formula 1, L1 and L2 are each independently an alkylene group of 1 to 3 carbon atoms.

12. The modified conjugated diene-based polymer of claim 6, wherein the modification initiator represented by Formula 2a is a compound represented by Formula 2aa below:

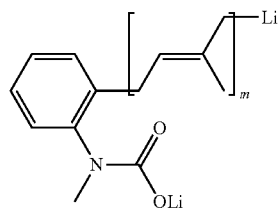

[Formula 2aa]

wherein m is an integer of 0 to 3.

13. The modified conjugated diene-based polymer of claim 6, wherein the compound represented by Formula 2b is a compound represented by Formula 2ba to Formula 2bd below:

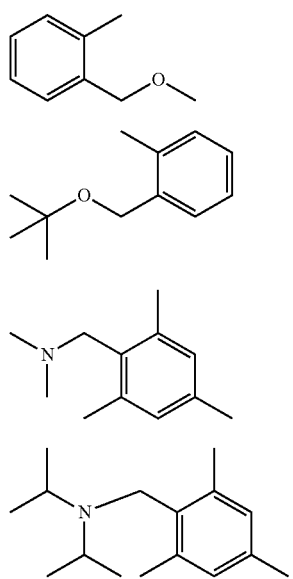

[Formula 2ba]

[Formula 2bb]

[Formula 2bc]

[Formula 2bd]

14. The modified conjugated diene-based polymer of claim 6, wherein the compound represented by Formula 2c is a compound represented by Formula 2ca to Formula 2cc below:

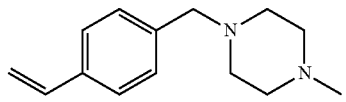

[Formula 2ca]

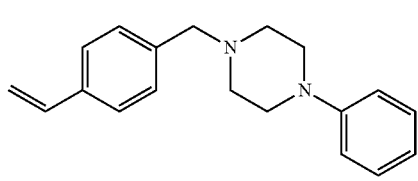

[Formula 2cb]

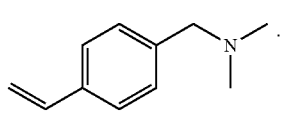

[Formula 2cc]

15. The modified conjugated diene-based polymer of claim 6, wherein the compound represented by Formula 2d is a compound represented by Formula 2da or Formula 2db below:

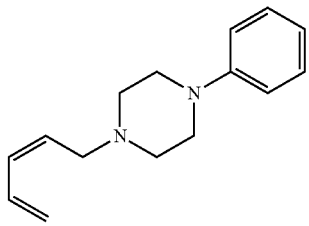

[Formula 2da]

[Formula 2db]

16. The modified conjugated diene-based polymer of claim 6, wherein the compound represented by Formula 2e is a compound represented by Formula 2ea below:

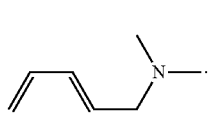

[Formula 2ea]

17. The modified conjugated diene-based polymer of claim 6, wherein the modification initiator represented by Formula 2f is a compound represented by Formula 2fa below:

[Formula 2fa]

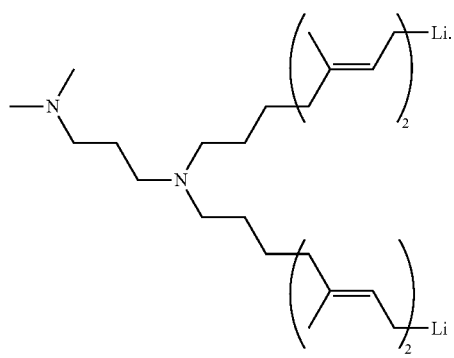

18. The modified conjugated diene-based polymer of claim 6, wherein the organometallic compound is one or more selected from an organolithium compound, an organosodium compound, an organopotassium compound, an organorubidium compound or an organocesium compound.

19. A method for preparing the modified conjugated diene-based polymer of claim 1, comprising polymerizing a conjugated diene-based monomer, or a conjugated diene-based monomer and an aromatic vinyl-based monomer in the presence of the modification initiator in a hydrocarbon solvent to prepare an active polymer which introduces a functional group derived from the modification initiator (S1); and reacting or coupling the active polymer prepared in step (S1) with the modifier represented by Formula 1 (S2), wherein step (S1) is continuously performed in two or more polymerization reactors, and a polymerization conversion ratio in a first reactor among the polymerization reactors is 50% or less.

* * * * *